United States Patent
Farrell

(10) Patent No.: US 9,168,696 B2
(45) Date of Patent: Oct. 27, 2015

(54) MARKED THERMOPLASTIC COMPOSITIONS, METHODS OF MAKING AND ARTICLES COMPRISING THE SAME, AND USES THEREOF

(75) Inventor: Tony Farrell, Bergen op Zoom (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 463 days.

(21) Appl. No.: 13/487,641

(22) Filed: Jun. 4, 2012

(65) Prior Publication Data

US 2013/0320276 A1    Dec. 5, 2013

(51) Int. Cl.
*F21V 9/00* (2015.01)
*G02B 5/02* (2006.01)
*G02C 7/10* (2006.01)
(Continued)

(52) U.S. Cl.
CPC ......... *B29C 65/1635* (2013.01); *B29C 65/1606* (2013.01); *B29C 65/1616* (2013.01); *B29C 65/1677* (2013.01); *B29C 66/1122* (2013.01); *B29C 66/306* (2013.01); *B29C 66/41* (2013.01); *B29C 66/43* (2013.01); *B29C 66/73921* (2013.01); *B41M 5/267* (2013.01); *B29C 65/1609* (2013.01); *B29C 66/71* (2013.01); *B29C 66/836* (2013.01); *B29L 2017/006* (2013.01); *B41M 3/10* (2013.01); *C08K 5/0041* (2013.01); *Y10T 29/49826* (2015.01)

(58) Field of Classification Search
USPC ......... 29/428; 156/272.8; 252/582; 264/1.37; 428/411.1, 412, 430, 446, 454, 480; 524/423, 449, 451, 456, 497, 537, 539, 524/556, 566, 570, 577, 586, 589, 599, 609, 524/612; 430/270.1, 363, 945
See application file for complete search history.

(56) References Cited

U.S. PATENT DOCUMENTS 5,268,321 A    12/1993    Shimizu et al.
5,576,377 A    11/1996    El Sayed et al.
(Continued)

FOREIGN PATENT DOCUMENTS

EP    0566312 A1    10/1993
EP    1925427 A1    5/2008
(Continued)

OTHER PUBLICATIONS

International Search Report; International Application No. PCT/IB2013/054610; International Filing Date: Jun. 4, 2013; Date of Mailing: Oct. 8, 2013; 5 Pages.
(Continued)

*Primary Examiner* — Bijan Ahvazi
(74) *Attorney, Agent, or Firm* — Cantor Colburn LLP

(57) ABSTRACT

In an embodiment, a method of inscribing a substrate comprises contacting the substrate with a laser beam to generate a mark, wherein the mark results from increasing the reflectivity of the thermoplastic material, wherein the substrate comprises a composition comprising a non-reflective thermoplastic material. In an embodiment, a method for generating a mark on an article comprises bonding a first component to a second component with a laser beam having a wavelength of greater than or equal to 800 nanometers, wherein the first component composition comprises a thermoplastic composition absorbing light having a wavelength of less than or equal to 500 nanometers and wherein the second component comprises a thermoplastic composition absorbing light having a wavelength of greater than or equal to 800 nanometers.

29 Claims, 5 Drawing Sheets

(51) Int. Cl.
*G02F 1/361* (2006.01)
*G03B 11/00* (2006.01)
*B29C 65/16* (2006.01)
*B41M 5/26* (2006.01)
*B29C 65/00* (2006.01)
B29D 11/00 (2006.01)
G02B 1/12 (2006.01)
G03C 7/00 (2006.01)
C08K 5/00 (2006.01)
B41M 3/10 (2006.01)
B29L 17/00 (2006.01)

(56) References Cited

U.S. PATENT DOCUMENTS

| | | | |
|---|---|---|---|
| 5,977,514 A | 11/1999 | Feng et al. | |
| 6,072,011 A | 6/2000 | Hoover | |
| 6,207,344 B1 | 3/2001 | Ramlow et al. | |
| 6,420,449 B1 | 7/2002 | Sagane et al. | |
| 6,627,299 B1 | 9/2003 | Feng et al. | |
| 6,631,977 B2 | 10/2003 | Andrews | |
| 6,723,864 B2 | 4/2004 | Silva et al. | |
| 7,223,512 B2 | 5/2007 | Lutz et al. | |
| 7,459,259 B2 * | 12/2008 | Engel et al. | 430/270.1 |
| 8,343,412 B2 | 1/2013 | Klein et al. | |
| 2004/0039145 A1 | 2/2004 | Silva et al. | |
| 2004/0055492 A1 | 3/2004 | Van Den Elshout et al. | |
| 2004/0059068 A1 | 3/2004 | Nodera | |
| 2004/0132892 A1 | 7/2004 | Kawakami et al. | |
| 2005/0217790 A1 | 10/2005 | Joachimi et al. | |
| 2007/0274559 A1 * | 11/2007 | Depta et al. | 382/100 |
| 2009/0130451 A1 * | 5/2009 | Farrell | 428/411.1 |
| 2011/0200801 A1 | 8/2011 | Pudleiner et al. | |
| 2012/0187672 A1 * | 7/2012 | Sakagami et al. | 281/38 |
| 2012/0316280 A1 | 12/2012 | Meyer et al. | |

FOREIGN PATENT DOCUMENTS

| | | | |
|---|---|---|---|
| EP | 2305460 A1 | 4/2011 | |
| EP | 2399740 A1 | 12/2011 | |
| JP | 1016390 A | 1/1998 | |
| JP | 2001164082 A | 6/2001 | |
| JP | 2002003548 A | 1/2002 | |
| JP | 2002309104 A | 10/2002 | |
| JP | 2003321615 A | 11/2003 | |
| JP | 2009012276 A | 1/2009 | |
| JP | 2009270002 A | 11/2009 | |
| WO | 0109230 A1 | 2/2001 | |
| WO | 0123189 A1 | 4/2001 | |
| WO | 2006087967 A1 | 8/2006 | |

OTHER PUBLICATIONS

Written Opinion of the International Searching Authority; International Application No. PCT/IB2013/054610; International Filing Date: Jun. 4, 2013; Date of Mailing: Oct. 8, 2013; 8 Pages.
Japanese Patent No. 1016390 (A); Publication Date: Jan. 20, 1998; Abstract Only; 1 Page.
Japanese Patent No. 2002003548 (A); Publication Date: Jan. 9, 2002; Abstract Only; 1 Page.
Japanese Patent No. 2003321615 (A); Publication Date: Nov. 14, 2003; Abstract Only; 1 Page.
Japanese Patent No. 2009012276 (A); Publication Date: Jan. 22, 2009; Abstract Only; 2 Pages.
Japanese Patent No. 2009270002 (A); Publication Date: Nov. 19, 2009; Abstract Only; 1 Page.
Japanese Patent No. 2001164082; Publication Date: Jun. 19, 2001; Abstract Only, 1 page.
Japanese Patent No. 2002309104; Publication Date: Oct. 23, 2002; Abstract Only, 1 page.
World Intellectual Property Organization Publication No. 2006087967; Publication Date: Aug. 24, 2006; Abstract Only, 1 page.
Bruce M. Mulholland, "Lasermarkable Engineering Resins"; Ticona Performance Driven Solutions; 2009; 9 pages.
Non-Final Office Action; U.S. Appl. No. 13/909,378; Filing Date: Jun. 4, 2013; Date of Mailing: Jun. 9, 2015; 25 Pages.
Restriction Requirement; U.S. Appl. No. 13/909,378; Filing Date: Jun. 4, 2013; Date of Mailing: Mar. 4, 2015; 7 Pages.

* cited by examiner

MARKED THERMOPLASTIC COMPOSITIONS, METHODS OF MAKING AND ARTICLES COMPRISING THE SAME, AND USES THEREOF

TECHNICAL FIELD

The present disclosure relates to marked thermoplastic compositions and methods of making and using the same.

BACKGROUND

A range of lasers operating at various wavelengths can be used to inscribe or mark thermoplastic compositions with text, logos, and/or other identifiers. For example, opaque thermoplastic compositions can be marked with a 1064 nanometer (nm) laser light and rely on heat build-up in the substrate as the method of interaction between the laser light and the thermoplastic composition. Depending on the composition and/or the lasering parameters, the heat generated either causes a char, i.e., carbonization, to form a dark mark, or, alternatively a swelling from the formation of voids just below the surface and yields a light colored mark on a dark background, i.e., foaming. A vaporization process, or the bleaching of an additive, or a bleaching of the combination of additives, can also achieve light colored marks by exposing the lighter colored, thermally stable materials below the surface. The 1064 nm laser is also used to mark transparent compositions to give a dark mark. However, the inherent low levels of absorption by most thermoplastics in this area of the electromagnetic spectrum (i.e., 500 nm to 1,200 nm) can lead to inhomogeneous interactions between the laser light and the transparent substrate, which can lead to localized superheating and an inconsistent or poor quality mark. As a consequence, low levels of carbon black or other more specialized near infrared absorbing pigments or additives are often required in order to increase the quality and consistency of the mark. A disadvantage of using such additives is a reduction in visible transmission, increased haze and large color shifts due to the inherent residual color or particulate nature of the additives.

A photochemical interaction between the substrate and the laser light is another reaction mechanism by which identifiers are transferred to thermoplastics compositions. Lower wavelength light lasers such as those at 532 nm and especially with wavelengths lower than 400 nm (e.g., ultraviolet) generate contrast in polymer compositions in such a manner. The process is often referred to as "cold marking" due to the perception that there is limited thermal effect from the interaction of the lasers with the thermoplastic compositions. Ultraviolet lasers are predominantly used to mark opaque thermoplastic compositions containing titanium dioxide and yield a dark mark on white or light colored substrates.

However, there are some problems associated with the above processes. For example, the laser is not restricted to interacting at the surface or upper portion of the substrate to be marked and the intense light from the laser easily passes through the outer part or layer. In most cases, it is desirable that the mark is confined to the surface or close to the surface and that the laser beam does not interact or damage other materials or components beneath the layer or part to be inscribed. Exemplary designs or structures wherein the material to be marked houses devices or overlays other materials include a two shot or over-molded part such as in automotive glazing, a thermoplastic screen or housing encasing electronic devices such as mobile phones. One option is the addition of either IR absorbing additives or scattering additives, such as titanium dioxide, to the outer material with, which restricts the transparency, haze, and colors available. Another problem is that an overt white or light colored mark is either impossible or the mark is a dark brown to tan color due to the persistent contribution from the carbonization effect and more particularly, in transparent compositions where a black mark is achieved due to strong carbonization of the material. Also, the durability of light colored marks is poor as the voids that cause the swelling are easily compressed and it is extremely difficult to achieve a semi-covert (i.e., barely visible) watermark, particularly in transparent compositions.

Another challenge exists when the material to be inscribed also functions as the laser transparent component in an article to be assembled by laser transmission welding (LTW). In general the lasers used for LTW are based on wavelengths longer than 800 nm. In order to join two components by LTW one component needs to be essentially laser transparent (e.g., no absorption), while the second component needs to absorb the laser light. The laser light then passes through the first component and heat is generated at the interface through the absorption of the laser light in the second component. The heat is conducted to the first layer, which melts and a weld is created upon re-solidification of both components. However, in some cases it is desired that the first component, which is transparent to laser light longer than 800 nm, also be inscribed with data. Even more desirable is the ability to inscribe a transparent, colored, opaque or dark colored first component suitable for LTW with a light mark. Thus, there is a need for the ability to generate a light colored mark on thermoplastic compositions.

It can also be desirable to be able to generate a range of contrast levels from an easily readable (e.g., light colored) mark to a semi-covert, barely visible, inscription with as little increase to the profile topography as possible, in order to eliminate the possibility of the layers lifting, separating, and/or cracking, for example when a laser inscription or mark is generated at the interface of two layers or at the interface of a thermoplastic layer and a coating. The change in the profile topography via carbonization, to form a dark mark or, alternatively, a swelling from a foaming process, can give profiles much larger than 50 micrometers and even larger than 100 micrometers.

SUMMARY

In one embodiment, a method of inscribing a substrate comprises: contacting the substrate with a laser beam to generate a mark, wherein the mark results from increasing the reflectivity of the thermoplastic material, wherein the substrate comprises a composition comprising a non-reflective thermoplastic material.

In one embodiment, an article comprises: a thermoplastic composition material capable of absorbing light having a wavelength less than or equal to 500 nanometers; wherein the article has a reflective laser mark.

In one embodiment, a method of attaching a first component to a second component comprises: contacting a first component comprising a first component composition and a second component comprising a second component composition with an ultraviolet laser beam having a wavelength less than or equal to 500 nanometers, wherein the first component composition comprises a non-reflective thermoplastic material that is transparent to laser light having a wavelength less than or equal to 500 nanometers and wherein the second component composition comprises a non-reflective thermoplastic material capable of absorbing light having a wavelength less than or equal to 500 nanometers; and generating an interaction between the first component and the second component to attach the first component to the second component.

In one embodiment, a method for generating a mark on an article comprises: bonding a first component to a second component with a laser beam having a wavelength of greater than or equal to 800 nanometers, wherein the first component composition comprises a thermoplastic composition absorbing light having a wavelength of less than or equal to 500 nanometers and wherein the second component comprises a thermoplastic composition absorbing light having a wavelength of greater than or equal to 800 nanometers.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
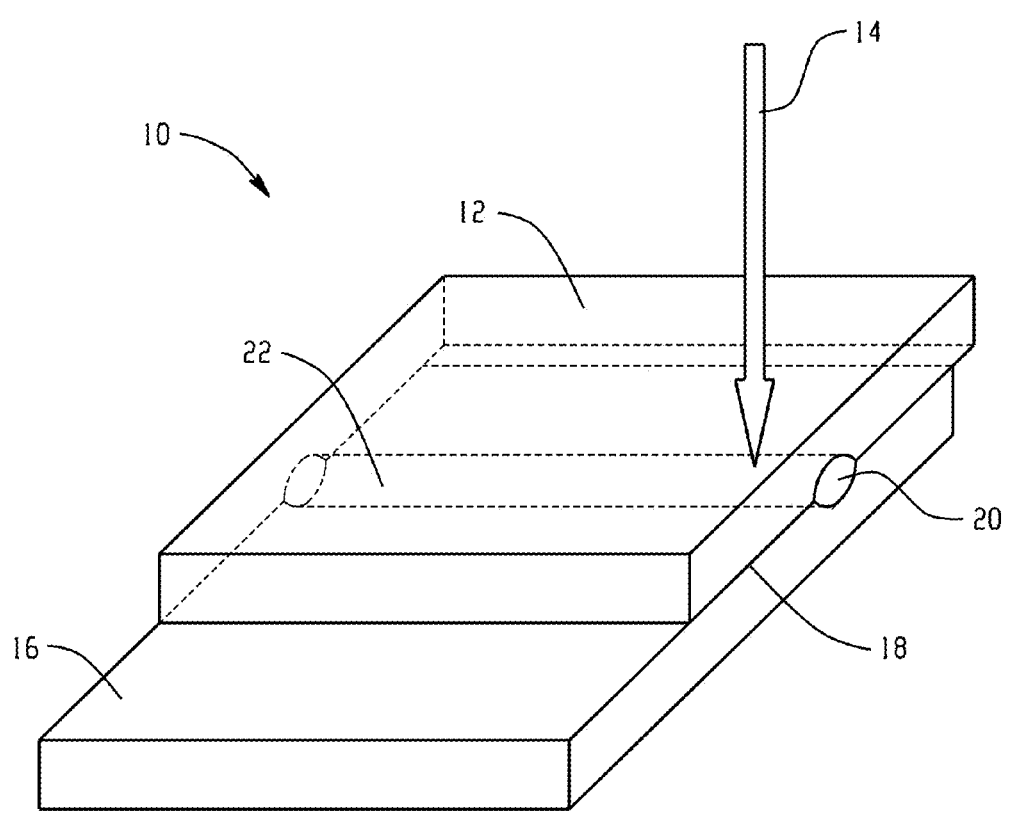
FIG. 1 is a schematic view of the laser welding process disclosed herein illustrating the laser marking options and positions.

Disclosed herein is a process that can inscribe transparent, opaque, and/or colored thermoplastic compositions having low visible reflectivity with customizable, and, optionally, machine-readable light colored text, logos, barcodes, and images using a laser beam to generate microdots of different optical properties (e.g., reflectivity) to the background wherein the mark can be clearly visible (e.g., identifiable by the human eye without magnification) to semi-covert (e.g., barely visible to the human eye). Laser beam and laser light are used interchangeably herein. It is to be understood that by laser beam as used herein does not refer to only a narrow projection of light, but also refers to and encompasses a broad array of light. A colorant can be added to a natural, uncolored material (e.g., neat resin) without changing the reflectivity. As described herein, a process or method has been developed to generate a light colored mark on transparent thermoplastic compositions, including compositions comprising polymers such as polycarbonate, bisphenol-A polycarbonate based copolymers, polyesters, polymethyl methacrylate (PMMA), polystyrene, polybutylene terephthalate, polyolefins, polyamides, polyvinylchloride, polylactic acid, and combinations comprising at least one of the foregoing, at or below the surface of an article, using laser beams having a wavelength less than or equal to 1000 nm. Some polymers can produce such an effect but the method described herein can provide a method to generate compositions that can enhance the process of generating a laser mark or even make it possible to generate a laser mark in compositions where a laser light cannot typically generate a mark. Table 1 provides an overview of laser types and the mechanisms by which they mark a thermoplastic substrate.

TABLE 1

| Laser Information | | | |
|---|---|---|---|
| Laser | Laser/Substrate Interaction | Wavelength | Reaction |
| $CO_2$ | Engraving of metals/polymers | 10,640 nm | Heat induced |
| IR (red) | Carbonization and foaming of polymers Ablation of thin layers (lacquer or film) | 1,064 nm | Heat induced |
| Green | Carbonization and foaming of polymers Ablation of thin layers (lacquer or film) Cutting of foils | 532 nm | Heat induced and Photochemistry |
| UV | "Cold marking" without thermal interaction | 355 nm | Photochemistry |
| Excimer | "Cold marking" without thermal interaction | 170 nm to 351 nm | Photochemistry |

An additive, e.g., an absorbing additive such as an ultraviolet absorbing additive and/or colorant can be added to a composition, e.g., a transparent thermoplastic such as polycarbonate, bisphenol-A based polycarbonate copolymers, polyesters, PMMA, polystyrene, polybutylene terephthalate, polyolefins, polyamide, polyvinylchloride, polylactic acid, and combinations comprising at least one of the foregoing. The additive can allow for the use of laser beams with a wavelength less than or equal to 2,000 nm, specifically, less than or equal to 1000 nm, and even more specifically, less than or equal to 500 nm to interact with the substrate and alter the reflectivity to produce a light colored mark via a thermal mechanism.

The compositions and methods described herein can allow light colored text, logos, and/or other identifiers to be inscribed or marked on or close to the surface of thermoplastic compositions (e.g., transparent thermoplastic compositions) at wavelengths of about 200 nm to 700 nm, specifically, 200 nm to 500 nm. For example, a white colored mark can be inscribed on a transparent material. As described herein, light colored can mean a white mark, where white can generally be described as white, off white, bright white ivory, snow, pearl, antique white, chalk, milk white, lily, smoke, seashell, old lace, cream, linen, ghost white, beige, cornsilk, alabaster, paper, whitewash, etc. The intensity and color of the mark can be modulated by varying laser parameters such as power, frequency, speed, line spacing, and focus, which allows marks of varying degrees of legibility or clarity to be generated. The legibility of the laser mark, whether on or close to the surface of the substrate, can be modulated from an easily readable light colored mark to a semi-covert, barely visible inscription, which may require specialized and sophisticated viewing devices to read and interpret the data. The resulting watermark or ghost mark can be used as a semi-covert method of identification and/or traceability for material or product identification. A watermark can generally be described as a recognizable image that appears when viewed by transmitted light (or when viewed by reflected light, atop a dark background) at specific angles. Watermarks can vary greatly in their visibility; while some are obvious on casual inspection, others require some study to observe.

Figure 7:
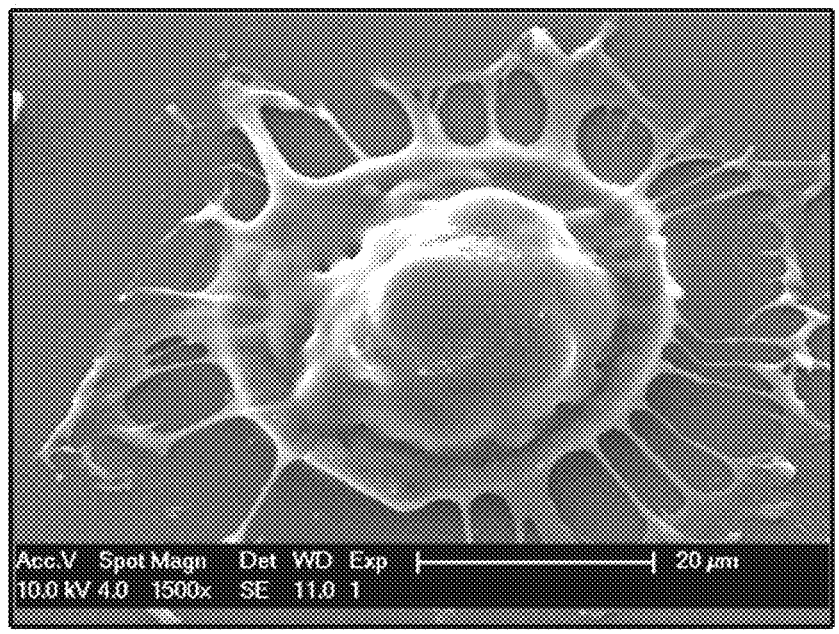
FIG. 7 is a scanning electron microscopic image of the marked square in the lower left hand corner of the matrix of Sample 22 as illustrated in FIG. 5.
Figure 8:
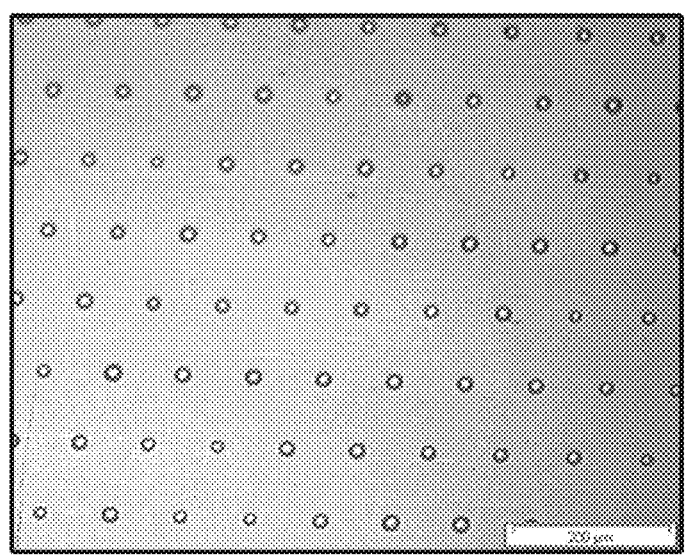
FIG. 8 is an optical image in transmission mode illustrating laser inscribed dots.

Without wishing to be bound by theory, it is believed that the treatment of the disclosed compositions with laser light having a wavelength less than or equal to 500 nm can produce a thermal interaction. In other words, the inscription can be a result of localized melting to generate an extremely small optically different, reflective or light scattering dot or array of dots. This is illustrated in FIG. 7, which shows a scanning electron microscopic (SEM) image of the bottom left square illustrated by reference number 30 in FIG. 5. The image in FIG. 7 illustrates that a UV laser induced thermal process can occur (i.e., melting at the surface). The composition and the laser process can control the light scattering effect of the individual dots or array of dots. Hence, the durability of the mark can therefore be as "tough" or durable as the substrate itself (e.g., cannot be scratched off).

The surprising thermal interaction between the disclosed compositions with laser light having a wavelength less than or equal to 500 nm can allow a laser light having a wavelength less than or equal to 500 nm to be used to join or weld two different components (e.g., a first component and a substrate) comprised of thermoplastic compositions such as polycarbonate, bisphenol-A based polycarbonate copolymers, polyesters, PMMA, polystyrene, polybutylene terephthalate, polyolefins, polyamides, polyvinylchloride, polylactic acid, and combinations comprising at least one of the foregoing. The components have different levels of absorption, transparency, and interaction to the laser beam having a wavelength less than or equal to 500 nm, such that the laser beam can pass through the first component without interaction and can then be absorbed by the second component to generate heat at the interface. The heat can then be conducted to the first layer, which melts, and a weld can be created upon resolidification of the components.

Further herein disclosed are articles that can comprise a first component comprising a first composition, and a second component (e.g., substrate) comprising a second composition where the first composition can comprise a polymer having little to no near infrared absorption at wavelengths greater than 800 nm to allow sufficient thermal build-up at the interface between the two components, which can allow the first component to be welded to the second component with a laser beam (e.g., laser light) having a wavelength longer than 800 nm. Such polymers include, but are not limited to non-scattering polymers such as polycarbonate, bisphenol-A based polycarbonate copolymers, polyesters, PMMA, polystyrene, and polyamides, and non-absorbing scattering crystalline or semi-crystalline polymers such as polybutylene terephthalate (PBT), polyethylene terephthalate (PET), polyolefins (e.g., high/low density polyethylene (H/LDPE), polypropylene (PP), etc.), and combinations comprising at least one of the foregoing. Having little to no infrared absorption at wavelengths greater than 800 nm can allow the first component to be attached (e.g., laser welded) to the substrate comprising a second composition that absorbs light at wavelengths greater than 800 nm and can be joined to the first component by a laser beam having light at wavelengths greater than 800 nm. The first composition can be visibly transparent, colored, and/or opaque, using non-infrared absorbing colorants or additives and can be capable of being inscribed with laser light at wavelengths less than 800 nm, specifically, less than 500 nm. Such a feature can be beneficial in applications where the first component is the viewed and authenticated component. Likewise, the substrate can be visibly transparent, colored, opaque, and/or un-pigmented (i.e., not colored).

The inscription (i.e., laser marking) can be located on the surface of the first component and/or the substrate. In processes such as two shot molding, over-molding, or a laser welded set-up, the inscription can be located within the first component (e.g., in the first shot) with no interaction with the substrate material or other components housed by the disclosed compositions. Not to be limited by theory, it is believed that the inscriptions disclosed herein are a result of near surface modification, rather than a through surface modification as is the case with carbonized marks or the result of foaming, which increases the void volume of the material. It is believed that the methods disclosed herein can generate a mark (i.e., inscription) without increasing the void volume of the material.

The inscription can also occur at the interface of two components (e.g., two layers), wherein the first component does not interact with the laser beam and the second component interacts with the laser beam to alter the optical properties (e.g., reflectivity) of the second component at the point of interaction, where the laser beam has a wavelength of less than or equal to 2,000 nm, specifically, less than or equal to 1,000 nm, and even more specifically, less than or equal to 500 nm. In either case, the inscription can be durable (i.e., cannot be scratched off the surface). The appearance of the inscription can change when viewed from either side of the material. For example, with a neat resin (i.e., no colorant), with all other parameters the same, similar results can be obtained from both sides of the article (i.e., front and back), meaning that the reflectivities are close to one another. The use of electromagnetic radiation to create a visibly perceivable laser inscribed contrast on a polymer material as described herein can range from clearly visible from poorly visible and/or visible under only specific lighting/viewing conditions (e.g., a watermark). The appearance of the contrast area can be manipulated by controlling the change in morphology of the polymeric material by changing the electromagnetic radiation variables.

Various articles comprising the inscriptions are described herein. The following description of articles is merely illustrative of articles that can be produced and inscribed using the methods disclosed herein and are not intended to limit the scope hereof. For example, the methods disclosed herein can be used to laser inscribe microdots exhibiting a variation in reflectivity compared to an unmarked substrate, at or below the surface of the substrate, with the microdots being arranged and modulated in intensity using the laser parameters to generate logos, texts, barcodes, and/or images (e.g., photographic images) in the following exemplified articles: glazing parts such as automotive panels and lamp bezels in which the mark, including a watermark, can be introduced on the surface of the part, pre- or post-coating and can also be placed over second shot areas to increase contrast; pharmaceutical or food packaging marks, including watermarks; electronic housings or screens in phones, computers, tablets, televisions, etc., where the mark, including a watermark, is on the surface or at the interface of two components, for example, where the first component comprises PMMA and the second component comprises polycarbonate; mark, including a watermark, on eyewear lenses and frames; an article with an image, including a photographic image, which is visible in positive or negative depending on whether the observer is viewing the image in transmission or reflection; contact recognition or Braille inscriptions; and marks, including a watermark, on the surface or subsurface at the interface of two layers within cards or tickets such as business cards, identification (ID) cards, customer cards, etc. The mark can be generated on the surface or at the interface of two layers (e.g., two components) wherein the entire card is transparent or exists as a window in an opaque card. Other possible layers in the ID card can include a metallic layer, a magnetic layer, a layer with angular metamerism properties, and combinations comprising at least one of the foregoing. The layers can be assembled via various processes including, but not limited to co-extrusion, co-lamination, etc.

More specifically, ID cards can, for example, comprise a core layer (e.g., reflective thermoplastic layer), and a transparent film layer comprising the compositions disclosed herein (e.g., either a material having the capability of absorbing light at wavelengths less than or equal to 500 nm or a material comprising a light absorbing additive having the capability of absorbing light at wavelengths less than or equal to 500 nm). Optionally, a cap layer can be disposed on a side of the transparent film layer opposite the core layer, e.g., to protect against scratches, provide added chemical resistance, and/or light resistance. Other layers having a thickness of less than or equal to 100 micrometers can be formed first by an extrusion, a melt casting, or solvent casting process, and optionally, stretched to reach the desired thickness. The cap layers, and other, optional layer(s) can be added (e.g., in the form of a coating that can be cured by an energy source such as an ultra violet lamp.

FIG. 1 illustrates a schematic of the process used to laser weld two components and form an article 10. In FIG. 1, laser exposure 14 (e.g., a laser beam) is directed through the first component 12 (e.g., a transparent polymer) to a second component 16 (e.g., a substrate that is laser absorbing), where laser exposure 14 is absorbed, resulting in the formation of heat at the interface 18 of the two layers. The heating generates a local melt pool 20 between the layers resulting in a weld of the first thermoplastic component 12 to the second laser weldable component 16. The laser exposure 14 generally follows a linear path of overlapping spot exposures to produce a welded seam 22. The second component 16 can additionally comprise an absorbing additive to enhance absorption of light from the laser beam.

Possible thermoplastic resins that may be employed include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such thermoplastic resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyether-sulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polybutylene terephthalate (PBT), polysulfonates, polysulfides, polyureas, polyphosphazenes, polysilazzanes, polysiloxanes, fluoropolymers (e.g., polyvinyl fluoride (PVF), polyvinylidene fluoride (PVDF), polyvinyl fluoride (PVF), fluorinated ethylene-propylene (FEP), polyethylenetetrafluoroethylene (ETFE)) and combinations comprising at least one of the foregoing.

More particularly, the thermoplastic resin can include, but is not limited to, polycarbonate resins (e.g., Lexan* resins, commercially available from SABIC Innovative Plastics), polyphenylene ether-polystyrene resins (e.g., Noryl* resins, commercially available from SABIC Innovative Plastics), polyetherimide resins (e.g., Ultem* resins, commercially available from SABIC Innovative Plastics), polybutylene terephthalate and/or polyethylene terephthalate resins (e.g., Valox* resins, commercially available from SABIC Innovative Plastics), polybutylene terephthalate-polycarbonate resins (e.g., Xenoy* resins, commercially available from SABIC Innovative Plastics), copolyestercarbonate resins (e.g. Lexan* SLX resins, commercially available from SABIC Innovative Plastics), and combinations comprising at least one of the foregoing resins. Even more particularly, the thermoplastic resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate), and combinations comprising at least one of the foregoing, for example, a combination of branched and linear polycarbonate.

As used herein, the term "polycarbonate" means compositions having repeating structural carbonate units of formula (1)

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

(2)

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3)

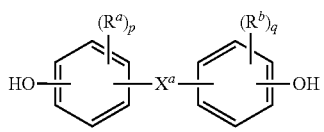

(3)

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

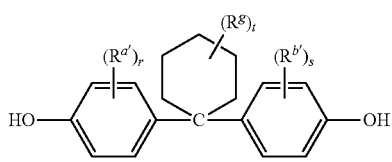

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5)

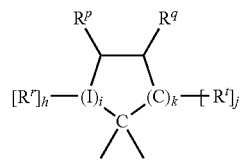

(5)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—R'—OH include compounds of formula (6)

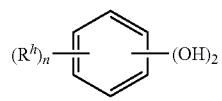

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3- ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-2-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (p,p-PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The homopolymer of DMBPC carbonate, which is represented by the x portion of formula (7) or its copolymer with BPA carbonate has an overall chemical structure represented by formula (7).

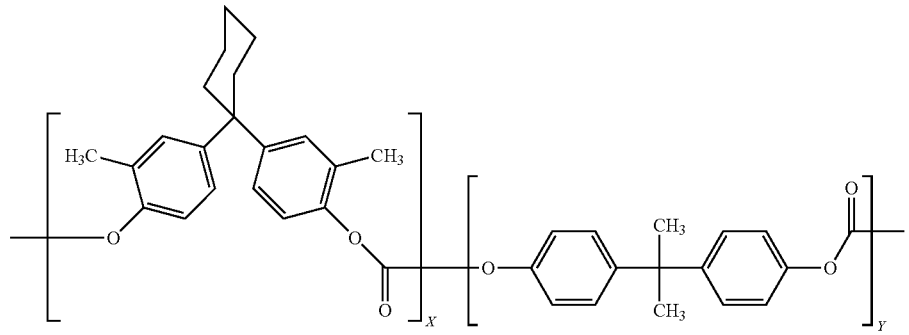

(7)

DMBPC carbonate can be co-polymerized with BPA carbonate to form a DMBPC BPA co-polycarbonate. For example, DMBPC based polycarbonate as a copolymer or homopolymer (DMBPC) can comprise 10 to 100 mol % DMBPC carbonate and 90 to 0 mol % BPA carbonate, specifically, 25 mol % DMBPC carbonate and 75 mol % BPA carbonate, more specifically, 50 mol % DMBPC carbonate and 50 mol % BPA carbonate.

The method of making any of the polycarbonates herein described is not particularly limited. It may be produced by any known method of producing polycarbonate including the interfacial process using phosgene and/or the melt process using a diaryl carbonate, such as diphenyl carbonate or bismethyl salicyl carbonate, as the carbonate source.

The polycarbonate can comprise a PPC polymer comprising a BPA carbonate block and an aromatic ester block (e.g., isophthalate and terephthalate) as shown in formula (8).

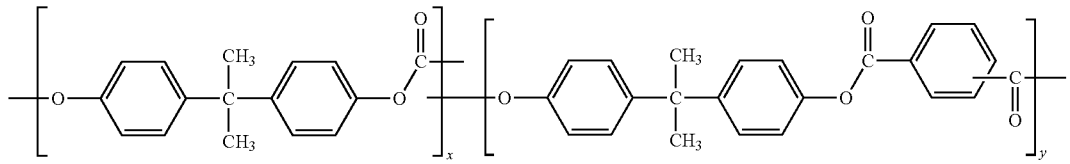

(8)

In an embodiment, the PPC polymer can comprise 10 mol % to 50 mol % BPA carbonate blocks and 50 mol % to 90 mol % aromatic ester blocks, specifically, 20 mol % BPA blocks and 80 mol % aromatic ester blocks, with an isophthalate to terephthalate ratio of 93:7.

A specific example of dihydroxy compounds of formula (2) can be the following formula (9).

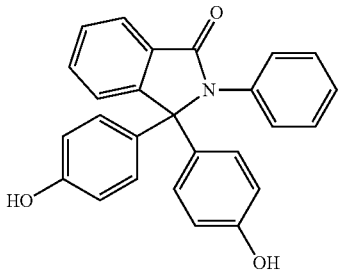

(9)

(also known as 3,3-bis(4-hydroxyphenyl)-2-phenylisoindolin-1-one (PPPBP)) also known as 2-phenyl-3,3-bis(4-hydroxyphenyl)phthalimidine.

The dihydroxy compounds of formula (2) can also be the following formula (10)

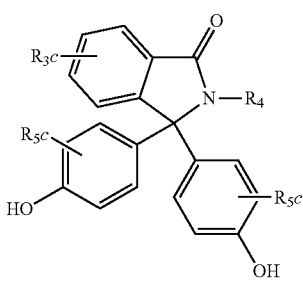

(10)

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

The polycarbonate can comprise a copolymer of p,p-PPPBP carbonate as described with respect to formulas (9) and (10) and BPA carbonate, where the copolymer has the structure illustrated in formula (11).

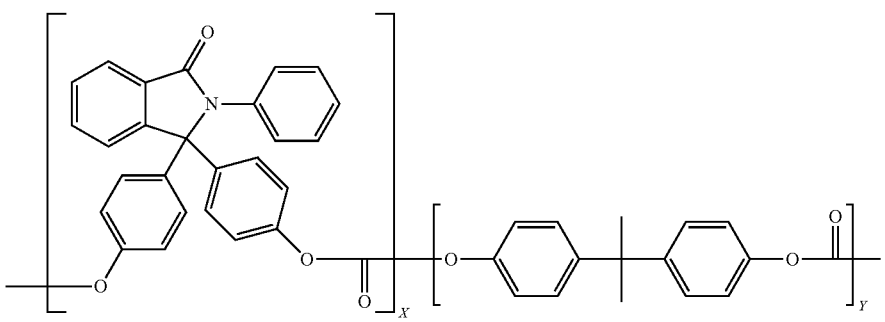

(11)

The copolymer of p,p-PPPBP carbonate and BPA carbonate can comprise 25 mol % to 75 mol % p,p-PPPBP carbonate and 75 mol % to 25 mol % BPA carbonate, specifically, 35 mol % p,p-PPPBP carbonate and 65 mol % BPA carbonate.

The compositions can include various additives ordinarily incorporated into polymer compositions of this type, with the proviso that the additive(s) are selected so as to not significantly adversely affect the desired properties of the composition. Such additives can be mixed at a suitable time during the mixing of the composition. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as carbon black and organic dyes), surface effect additives, radiation stabilizers (e.g., infrared absorbing), flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.001 wt. % to 5 wt. %, based on the total weight of the composition.

Absorbing additives such as light stabilizers and/or ultraviolet light (UV) absorbing stabilizers can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.001 to 5 parts by weight, based on 100 parts by weight of the total composition, excluding any filler.

Exemplary UV absorbing additives include hydroxybenzophenones; hydroxybenzotriazoles; hydroxybenzotriazines; cyanoacrylates; oxanilides; benzoxazinones benzylidene malonates; hindered amine light stabilizers; nanoscale inorganics such as nickel quenchers, metal oxides, mixed metal oxides, metal borides; and combinations comprising at least one of the foregoing; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.001 to 5 parts by weight, based on 100 parts by weight of the total composition, excluding any filler. Inorganic additives such as lanthanum hexaboride ($LaB_6$) or Cesium tungsten oxide (CTO) can also be used to enhance the interaction of compositions with laser light and improve mark contrasts.

Colorants such as pigment and/or dye additives can also be present alone or in combination with UV absorbing stabilizers having little residual visible coloration in order to modulate the substrate color as well as the color and contrast of the laser inscribed text, logos, barcodes, images, etc. by directly contributing to the change of reflectivity. Useful pigments can include, organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Exemplary dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. It is to be understood that any of the above described additives, UV absorbers, colorants, etc. can be used with any of the materials described herein and is not limited to polycarbonate.

The following examples are merely illustrative of the disclosed herein and are not intended to limit the scope hereof.

EXAMPLES

Various compositions were tested to determine their interaction with laser light and their ability to be inscribed. Thermoplastic test specimens were prepared by melt extrusion on a Werner & Pfleiderer 25 mm twin screw extruder, using a nominal melt temperature of 290° C. to 310° C., pressure of 25 inches (635 mm) of mercury vacuum and 450 revolutions per minute (rpm). The extrudate was pelletized and dried at 110° C. for 3 hours. Test specimens were produced (60 mm×60 mm×2 mm) from the dried pellets and were injection molded at nominal temperatures of 290° C. to 320° C.

The color data was acquired on an X-rite 1-7 spectrophotometer in the range 360 nm to 750 nm. The transmission data was acquired using a 25 mm aperture, while the reflection data was acquired in specular excluded mode using a 10 mm aperture with a RAL 9005-GL card placed behind the part. RAL is a color standard used in Europe. The transmission and reflection data was measured using parts having a thickness of 1 mm according to ASTM D1003-00 using D65 illumination and 10 degrees observer. The color from the laser inscribed areas was evaluated on a 15 mm×15 mm square using the 10 mm aperture with a RAL 9005-GL card placed behind the laser marked square. The visible transmission (i.e., Tvis) measurements were acquired on a HAZE-GUARD plus from BYK-Gardner instruments. Visible transmission can be measured by measuring haze in accordance with ASTM D-1003-00, Procedure A using an integrating sphere (0°/diffuse geometry), wherein the spectral sensitivity conforms to the Commission Internatinale de L'Eclairage) (CIE, 1931) standard spectral value under standard lamp D65.

A Trumark 6330 laser (355 nm), which has a power output of 2 Watts (W), and a Trumark 6130 laser (1064 nm) were used to inscribe the test pieces with a processing matrix consisting of a range of laser conditions such as frequency of 20 to 40 kiloHertz (kHz), speed of 600 to 1800 millimeters per second (mm/sec), and a fill factor of 0.03 to 0.45 mm, i.e., the spacing between adjacent lines of laser dots. The power setting was 95% unless otherwise stated. Scanning electron microscopy (SEM) was used to acquire SEM micrographs using a FEI XL 30 microscope, operated at a voltage of 15 kiloVolts (kV). Samples were coated with gold (Au) and/or palladium (Pd) prior to the SEM investigation. Optical images were obtained using an Olympus BX60F microscope, in reflection and transmission mode. The laser marked plaques were scanned using an Epson Perfection V750-Pro. The images were acquired with a 600 dot per inch (dpi) setting. The laser marked plaques were placed on a RAL 9005-GL card and a RAL 9010-GL card was placed beside it for referencing on a scale of 0 to 255. The acquired images were evaluated using ImageJ 1.44 software to measure the contrast on the front and the back of the sample (see e.g., Table 8).

Profilometry measurements were obtained using a Veeco Dektak 6M Stylus Profiler using the following experimental conditions: scan length: 2700 µm, resolution 0.265 µm/s, stylus force 3 mg. Calibration was performed using a standard of known dimensions: nominal 10 KA (1 µm), measuring report (SI).

For welding, high gloss surface test pieces were placed together with the corresponding high gloss surface part, where the top samples were laser transparent at wavelengths of greater than 800 nm and laser absorbing at wavelengths less than 500 nm and the lower samples were laser absorbing at wavelengths greater than 800 nm. The overlapped area was then irradiated with a diode laser (960 nm) with a beam diameter of 2 mm.

The materials used for the compositions are listed in Table 2. Samples were made using various combinations of the materials listed in Table 2. The samples were made as described above. The samples were then laser marked with a UV laser (e.g., having a laser beam with a wavelength of 355 nm) and a near infrared laser (NIR) (e.g., having a laser beam with a wavelength of 1064 nm) to determine the ability of the samples to be marked. As described and used herein, UV light refers to light having a wavelength of 10 nm to 400 nm, while near-infrared light refers to light having a wavelength of 700 nm to 5,000 nm. Unless otherwise stated, the samples had a thickness of 1 mm.

TABLE 2

| Component | Description | Source |
| --- | --- | --- |
| PC1 | Bisphenol-A based polycarbonate resin ($M_w$ = 30,000 g/mol, PS standards) | Lexan*, SABIC Innovative Plastics |
| PC2 | Bisphenol-A based polycarbonate resin ($M_w$ = 22,000 g/mol, PS standards) | Lexan*, SABIC Innovative Plastics |
| PC3 | Poly(20 wt. % isophthalate-terephthalate-resorcinol ester)-co-(80 wt. % bisphenol-A carbonate) copolymer ($M_w$ = 60,000 g/mol, PS standards) | SABIC Innovative Plastics |
| PC4 | Poly(90 wt. % isophthalate-terephthalate-resorcinol)-co-(10 wt. % bisphenol-A carbonate) copolymer ($M_w$ = 40,000 g/mol, PS standards) | SABIC Innovative Plastics |
| PC5 | PC/PDMS copol (20% siloxane) | SABIC Innovative Plastics |
| PC6 | DMBPC-BPA (50:50) Copolycarbonate ($M_w$ = 22,000 g/mol, PS standards) | SABIC Innovative Plastics |
| PC7 | PPPBP/BPA (35:65) Copolycarbonate ($M_w$ = 25,000 g/mol, PS standards) | SABIC Innovative Plastics |
| PC8 | Transparent PC-siloxane copolymer ($M_w$ = 23,000 g/mol, PS standards) | SABIC Innovative Plastics |
| PC9 | Branched PC ($M_w$ = 38,000 g/mol, PS standards) | SABIC Innovative Plastics |
| CYASORB UV-3638 | 2,2(P-PHENYLEN)DI-3,1BENZOXAZIN | CYTEC INDUSTRIES BV |
| UVA 234 | 2-(2 hydroxy-3,5 dicumyl) benzotriazole | Tinuvin 234, Ciba Specialty Chemicals |
| PCTG | Poly(20 mol % ethylene terephthalate)-co-(80 mol % 1,4-cyclohexanedimethyleneterephthalate) ($M_w$ = 70,000 using polystyrene standards) | Eastman Chemical Co. |
| PETS | Pentaerythritol tetrastearate | Lonza, Inc. |
| Pigment Black 7 | Printex 85, Monarch 800 | DEGUSSA AG, Cabot |
| UVA 5411 | 2-(2 hydroxy-5-t-octylphenyl) benzotriazole | Tinuvin 329, Ciba Specialty Chemicals |
| AO1076 | Octadecyl (3,5-di-tert-butyl-4-hydroxyphenyl)propionate | Irganox 1076, Ciba Specialty Chemicals |
| Loxiol EP8578 | Palmitic/Stearic Acid Ester of Dipenta/Pentaerythritol | COGNIS OLEOCHEMICALS GMBH |
| PPC-resin | Amorphous poly(ester-carbonate), bisphenol A based poly(phthalate-carbonate) containing 80% isophthalate-terephthalate ester units ($M_w$ = 28,500 g/mol, using polystyrene standards) | SABIC Innovative Plastics |
| Pigment Blue 60 | Copolyestercarbonate, known as bisphenol acetone based (poly(phthalate carbonate) containing 60% ester ($M_w$ = 28,000 g/mol, PS standards) | BASF |
| Solvent violet 36 | 1,8-Bis[(4-methylphenyl)amino]-9,10-anthracenedione | LANXESS, (Macrolex Violet 3R) |
| Solvent Red 135 | MACROLEX ™ Red EG | Lanxess |
| Solvent Yellow 98 | 2-Octadecyl-1H-thioxantheno[2,1,9-def]isoquinoline-1,3(2H)-dione | Clariant, Hostasol Gelb 3G |
| Vat Red 41 | 1H-Thioxantheno[2,1,9-def]isoquinoline-1,3(2H)-dione,2-octadecyl | Clariant, Hostasol Red 5B |
| Solvent Blue 104 | 1,4-bis(2,4,6-trimethylanilino)-anthraquinone | Clariant, Sandoplast Blue 2B |
| Solvent Yellow 163 | 1,8-Bis(phenylthio)anthraquinone | Ciba Speciality Chemicals, ORACET ™ Yellow GHS |
| Copper Phthalocyanine Pigment Blue 15:4 | Copper, (29H,31H-phthalocyaninato(2-)-N29,N30,N31,N32)-, (SP-4-1) | BASF, Heliogen Blue K7100 |
| Pigment Green 7 | Cu-Phthalocyanine Halogenated | BASF, Heliogen Green K8730 |
| Copper Phthalocyanine Pigment Blue 15:1 | Copper, (29H,31H-phthalocyaninato(2-)-N29,N30,N31,N32)-, (SP-4-1)- | BASF, Heliogen Blue K6911D |
| Solvent Violet 13 | 1-(p-methylaniline)-4-hydroxy anthraquinone | Lanxess, Macrolex Violet B |
| Pigment Blue 15:4 | Copper Phthalocyanine Beta | BASF, Heliogen Blue K7104LW |
| Pigment Yellow 138 | 3,4,5,6-Tetrachloro-N-[2-(4,5,6,7-tetrachloro-2,3-dihydro-1,3-dioxo-1H-inden-2-yl)-8-quinolyl]phthalimide | BASF, Paliotol Yellow K 0961 HD |
| Phosphonite PEPQ | Mixture of phosphonous acid esters | Irgafos PEPQ, Ciba Specialty Chemicals |

TABLE 2-continued

Material Description

| Component | Description | Source |
|---|---|---|
| Epoxy | 3,4-epoxy cyclohexyl methyl-3,4-epoxy cyclohexyl carboxylate | Epoxy Resin ERL 4221, Dow Chemical |
| $TiO_2$ | Titanium dioxide | KRONOS ™ 2233 |
| KSS | potassium diphenylsulphon-3-sulphonate | SEAL SANDS CHEMICALS LTD |
| PTFE & T-SAN | 50% Poly(tetrafluoroethylene) + 50% E-SAN | SABIC Innovative Plastics |
| Antioxidant | tris(2,4-di tert.butylphenyl) phosphite | Irgafos 168, Ciba Specialty Chemicals |
| Phosporic Acid solution | Phosporic Acid diluted with Water to 10% | QUARON |
| Styrene-acrylate-epoxy oligomer | Joncryl ADR4368S | BASF |
| Solvent Green 3 | MACROLEX ™ GREEN 5B | Lanxess |
| AO1010 | Pentaerythritol tetrakis(3,5-di-tert-butyl-4-hydroxyhydrocinnamate) | Irganox 1010, Ciba Specialty Chemicals |
| $LaB_6$ (lanthanum hexaboride) master batch in polycarbonate | KHCS-06 TM (pigment dispersion 0.25% $LaB_6$ in PC) | Alconix Europe GmbH |
| CTO (cesium tungsten oxide) master batch in polycarbonate | YMCS-06 TM (pigment dispersion 1.23% CTO in PC) | Alconix Europe GmbH |
| PMMA | Plexiglas 8N | Evonik Degussa GmbH |
| Polystyrene | SP256 | Supreme Petrochem LTD |
| Grialamid TR55 | GRILAMID TR 55 LX (transparent thermoplastic polyamide based on aliphatic and cycloaliphatic blocks) | EMS-Grivory |

Example 1

Tables 3 through 7 list formulations and laser marking ability of samples produced using the methods and compositions disclosed herein. Each of the samples comprised a first component having a thickness of 1 mm and the compositions disclosed in the tables. The results of Comparative Examples 1 to 5 (C1-C5) are illustrated in Table 3, while the results for Samples 1 to 5 are illustrated in Table 4. As can be seen from Table 3, C1 exhibited poor interaction with laser light (UV through to near infrared), giving an in-homogenous mark. When a small amount of carbon black was added to the samples as demonstrated in C2 to C5, the interaction with the 1064 nm laser light improved, giving a more homogenous dark mark as the loading of carbon black was increased via a carbonization process. The addition of carbon black, however, greatly impairs the color and transmission levels of visible light and the Tvis as measured according to ASTM D1003. A greyish mark is achieved when these parts are irradiated with a UV laser with some increase in reflection and L*, but the mark is much darker when viewed and measured from the rear side through the 1 mm part due to increased absorption from a carbonization type process. The laser light (UV through to near infrared) passed through the 1 mm parts and marked or otherwise intersected with a laser sensitive substrate placed under the parts for C1 to C5.

Surprisingly, Sample 1, comprising a first component having a thickness of 1 mm, was able to be inscribed with a light mark when laser light with a wavelength less than or equal to 500 nm was utilized. Even more surprising was that in Sample 1, the measured L* and reflection of the UV laser marked areas are more or less the same when viewed and measured from the rear side. Such a characteristic is very desirable in cases where the laser mark is applied on the opposite side to the viewing side. Additionally, a laser sensitive substrate placed underneath Sample 1 remained unmarked. It was also surprising to discover that the addition of an organic additive capable of strongly absorbing light at wavelengths less than or equal to 500 nm to give Sample 2, also gave a light colored mark when laser light having a wavelength of less than or equal to 500 nm was utilized. Unlike the addition of carbon black with C2 to C5, in Sample 2, the color and Tvis were essentially unchanged.

The addition of an organic additive capable of strongly absorbing light at wavelengths less than or equal to 500 nm as in Sample 4 compared to Sample 1, improved the contrast and additionally broadened the laser marking process window by increasing the marking speed. Surprisingly, the combination of small amounts of carbon black to Samples 2 and 4, giving Samples 3 and 5, increased the L* and reflection of the mark achieved from a laser with a wavelength less than or equal to 50 nm without compromising the color of the mark on the rear side due to carbonization. In Samples 1 to 5, the interaction between the laser and the sample was restricted to the first component having a thickness of 1 mm. The intense light from the laser did not pass through the first component and mark the laser sensitive substrate, unlike in C1 to C5, indicating that the inclusion of an organic additive with a strong absorption of light less than or equal to 500 nm can protect an underlying substrate from being marked with a laser beam.

Similar trends were seen in the samples displayed in Tables 5 to 7, which included resins such as polystyrene, polyamide, and polymethylmethacrylate.

TABLE 3

| Material | C1 | C2 | C3 | C4 | C5 |
|---|---|---|---|---|---|
| PC1 | 99.65 | 99.6498 | 99.649 | 99.648 | 99.646 |
| PETS | 0.3 | 0.3 | 0.3 | 0.3 | 0.3 |
| Irgafos 168 AO1076 | 0.05 | 0.05 | 0.05 | 0.08 | 0.08 |
| Pigment Black 7 | | 0.0002 | 0.001 | 0.002 | 0.004 |
| Total | 100 | 100 | 100 | 100 | 100 |

TABLE 3-continued

| Material | C1 | C2 | C3 | C4 | C5 |
|---|---|---|---|---|---|
| Tvis | 88 | 87 | 80 | 72 | 57 |
| % Transmission at 360 nm (%) | 78 | 72 | 62 | 52 | 34 |
| L* of substrate (reflection mode) | 5 | 6 | 5 | 4 | 3 |
| Average % reflection (360-700 nm) substrate | 0.8 | 0.6 | 0.6 | 0.4 | 0.3 |
| 355 nm laser beam marking | | | | | |
| Substrate marked | Yes | Yes | Yes | Yes | Yes |
| L* of selected mark (front side) | 43 | 40 | 47 | 47 | 47 |
| L* of selected mark (back side) | 21 | 19 | 13 | 14 | 12 |
| Delta L* mark | 22 | 21 | 34 | 33 | 35 |
| Average % reflection mark (front side) | 12.7 | 11.2 | 15.4 | 15.7 | 15.6 |
| Average % reflection mark (rear side) | 3.1 | 2.7 | 1.6 | 1.4 | 1.4 |
| Delta % Reflection mark | 9.6 | 8.5 | 13.8 | 14.3 | 14.2 |
| 1064 nm laser beam marking | | | | | |
| Substrate marked | Yes | Yes | Yes | Yes | Yes |

TABLE 4

| Material | 1 | 2 | 3 | 4 | 5 |
|---|---|---|---|---|---|
| PC1 | 17.58 | 99.4 | 99.3998 | 17.58 | 17.58 |
| PC7 | 82 | | | 81.75 | 81.7498 |

TABLE 4-continued

| Material | 1 | 2 | 3 | 4 | 5 |
|---|---|---|---|---|---|
| PETS | 0.3 | 0.3 | 0.05 | 0.3 | 0.3 |
| Irgafos 168 | 0.08 | 0.05 | 0.3 | 0.08 | 0.08 |
| AO1076 | 0.04 | | | 0.04 | 0.04 |
| UVA 5411 | | 0.25 | 0.25 | 0.25 | 0.25 |
| Pigment Black 7 | | | 0.0002 | | 0.0002 |
| Total | 100 | 100 | 100 | 100 | 100 |
| Tvis | 89 | 88 | 86 | 88 | 88 |
| % Transmission at 360 nm | 58 | 2 | 2 | 2 | 2 |
| L* of substrate (reflection mode) | 4 | 5 | 4 | 4 | 4 |
| Average % reflection (360-700 nm) substrate | 0.8 | 0.7 | 0.4 | 0.6 | 0.4 |
| 355 nm laser beam marking | | | | | |
| Substrate marked | No | No | No | No | No |
| L* of selected mark (front side) | 55 | 65 | 66 | 57 | 58 |
| L* of selected mark (back side) | 53 | 59 | 61 | 52 | 56 |
| Delta L* mark | 2 | 6 | 5 | 5 | 2 |
| Average % reflection mark (front side) | 21.1 | 27.8 | 33.3 | 22.7 | 23.9 |
| Average % reflection mark (rear side) | 19.0 | 22.9 | 25.3 | 18.6 | 20.7 |
| Delta % Reflection mark | 2.1 | 4.9 | 8.0 | 4.1 | 3.2 |
| 1064 nm laser beam marking | | | | | |
| Substrate marked | Yes | Yes | Yes | Yes | Yes |

TABLE 5

| Material | C6 | C7 | C8 | 6 | 7 | 8 | 9 | 10 |
|---|---|---|---|---|---|---|---|---|
| PC6 | 99.5 | 99.4998 | 99.4995 | 99.25 | | | | |
| PC2 | | | | | 18 | 18 | | |
| PETS | 0.4 | 0.4 | 0.4 | 0.4 | | | 0.3 | 0.3 |
| AO1076 | 0.1 | 0.1 | 0.1 | 0.1 | 0.06 | 0.06 | 0.05 | 0.05 |
| UVA 5411 | | | | 0.25 | | 0.25 | | 0.25 |
| PC9 | | | | | | | 99.65 | 99.4 |
| PC8 | | | | | 81.94 | 81.69 | | |
| Pigment Black 7 | | 0.0002 | 0.0005 | | | | | |
| Total | 100 | 100 | 100 | 100 | 100 | 100 | 100 | 100 |
| Tvis | 88 | 88 | 81 | 87 | 85 | 83 | 87 | 87 |
| % Transmission at 360 nm | 76 | 74 | 72 | 2 | 75 | 2 | 71 | 2 |
| L* of substrate (reflection mode) | 5 | 4 | 3 | 5 | 6 | 5 | 5 | 5 |
| Average % reflection (360-700 nm) substrate | 0.6 | 0.4 | 0.5 | 0.5 | 0.8 | 0.6 | 1.2 | 0.7 |
| 355 nm laser beam marking (95% power) | | | | | | | | |
| Substrate marked | Yes | Yes | Yes | No | Yes | No | Yes | No |
| L* of selected mark (front side) | 38 | 41 | 43 | 67 | 38 | 61 | 36 | 54 |
| L* of selected mark (back side) | 22 | 16 | 15 | 61 | 28 | 55 | 24 | 50 |
| Delta L* mark | 16 | 25 | 28 | 6 | 10 | 6 | 12 | 4 |
| Average % reflection mark (front side) | 9.7 | 11.7 | 12.6 | 33.7 | 9.9 | 27.3 | 10.5 | 21.9 |
| Average % reflection mark (rear side) | 3.3 | 2.1 | 1.8 | 25.3 | 5.4 | 20.4 | 5.9 | 19.4 |
| Delta % Reflection mark | 6.4 | 10 | 11 | 8.4 | 4.5 | 6.8 | 4.6 | 2.5 |
| 1064 nm laser beam marking (95% power) | | | | | | | | |
| Substrate marked | Yes | Yes | Yes | Yes | Yes | Yes | Yes | Yes |

TABLE 6

| Material | C9 | 11 | 12 | 13 | 14 | 15 |
|---|---|---|---|---|---|---|
| PC3 | 99.61 | 99.36 | | | | |
| PETS | 0.3 | 0.3 | 0.3 | 0.3 | 0.3 | 0.3 |
| Epoxy | 0.03 | 0.03 | 0.03 | 0.03 | 0.03 | 0.03 |
| Phosphonite PEPQ | 0.06 | 0.06 | 0.06 | 0.06 | 0.06 | 0.06 |
| UVA 5411 | | 0.25 | | 0.25 | | 0.25 |
| PC4 | | | | | 99.61 | 99.36 |
| PPC-resin | | | 99.61 | 99.36 | | |
| Total | 100 | 100 | 100 | 100 | 100 | 100 |
| Substrate marked | Yes | No | No | No | No | No |
| Tvis | 89 | 90 | 89 | 89 | 91 | 84 |
| % Transmission at 360 nm | 74 | 2 | 51 | 2 | 38 | 1 |
| L* of substrate (reflection mode) | 7 | 7 | 4 | 4 | 14 | 14 |
| Average % reflection (360-700 nm) substrate | 0.8 | 0.8 | 0.5 | 0.4 | 2.1 | 1.7 |
| 355 nm laser beam marking | | | | | | |
| L* of selected mark (front side) | 43 | 62 | 52 | 59 | 55 | 60 |
| L* of selected mark (back side) | 36 | 58 | 49 | 58 | 50 | 56 |
| Delta L* mark | 7 | 4 | 3 | 1 | 5 | 4 |
| Average % reflection mark (front side) | 12.8 | 28.0 | 18.9 | 24.0 | 21.3 | 25.8 |
| Average % reflection mark (rear side) | 8.3 | 22.8 | 15.3 | 21.2 | 16.9 | 20.9 |
| Delta % reflection mark | 4.5 | 5.3 | 3.6 | 2.8 | 4.5 | 4.9 |
| 1064 nm laser beam marking | | | | | | |
| Substrate marked | Yes | Yes | Yes | Yes | Yes | Yes |

TABLE 7

| Material | C10 | C11 | C12 | 16 | 17 | 18 |
|---|---|---|---|---|---|---|
| Grilamid TR55 | 100 | | | 90.6 | | |
| PMMA | | 100 | | | 90.6 | |
| Polystyrene | | | 100 | | | 90.6 |
| CYASORB UV-3638 | | | | 0.4 | 0.4 | 0.4 |
| Total | 100 | 100 | 100 | 100 | 100 | 100 |
| Tvis | 92 | 92 | 90 | 88 | 92 | 86 |
| % Transmission at 360 nm | 34 | 38 | 82 | 9 | 3 | 2 |
| L* of substrate (reflection mode) | 4 | 4 | 5 | 4 | 4 | 5 |
| Average % reflection (360-700 nm) substrate | 0.5 | 0.4 | 0.6 | 0.5 | 0.5 | 0.5 |
| 355 nm laser beam marking (95% power) | | | | | | |
| Substrate marked | No | No | Yes | No | No | No |
| L* of selected mark (front side) | — | — | 38 | 61 | 63 | 48 |
| L* of selected mark (back side) | — | — | 23 | 58 | 58 | 44 |
| Delta L* mark | — | — | 15 | 3 | 5 | 3 |
| Average % reflection mark (front side) | — | — | 9.9 | 28.4 | 29.7 | 15.8 |
| Average % reflection mark (rear side) | — | — | 3.7 | 23.1 | 23.8 | 12.3 |
| Delta % reflection mark | — | — | 6.3 | 5.3 | 5.9 | 3.5 |
| 355 nm laser beam marking (85% power) | | | | | | |
| L* of selected mark (front side) | — | — | — | 58 | 64 | 51 |
| L* of selected mark (back side) | — | — | — | 53 | 60 | 47 |
| Delta L* mark | — | — | — | 5 | 4 | 4 |
| Average % reflection mark (front side) | — | — | — | 24.7 | 31.6 | 18.1 |
| Average % reflection mark (rear side) | — | — | — | 18.7 | 25.1 | 15.5 |
| Delta % reflection mark | — | — | — | 6.0 | 6.5 | 3.5 |
| 355 nm laser beam marking (75% power) | | | | | | |
| L* of selected mark (front side) | — | — | — | 43 | 61 | 38 |
| L* of selected mark (back side) | — | — | — | 37 | 59 | 23 |
| Delta L* mark | — | — | — | 6 | 2 | 15 |
| Average % reflection mark (front side) | — | — | — | 12.4 | 28.0 | 9.9 |
| Average % reflection mark (rear side) | — | — | — | 8.5 | 24.3 | 3.7 |
| Delta % reflection mark | — | — | — | 3.9 | 3.7 | 6.3 |
| 1064 nm laser beam marking | | | | | | |
| Substrate marked | Yes | Yes | Yes | Yes | Yes | Yes |

Figure 2:
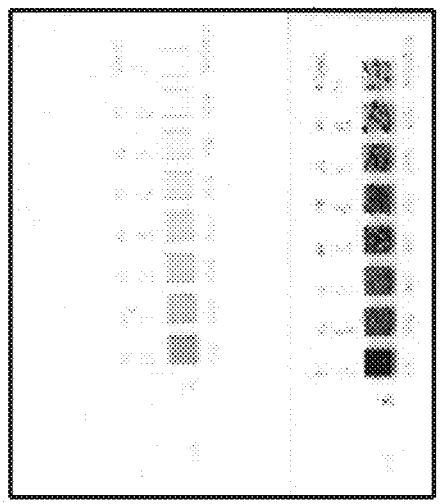
FIG. 2 is a scanned image of Comparative Example 1 on a white background and which was inscribed with a 1064 nanometer laser beam.
Figure 3:
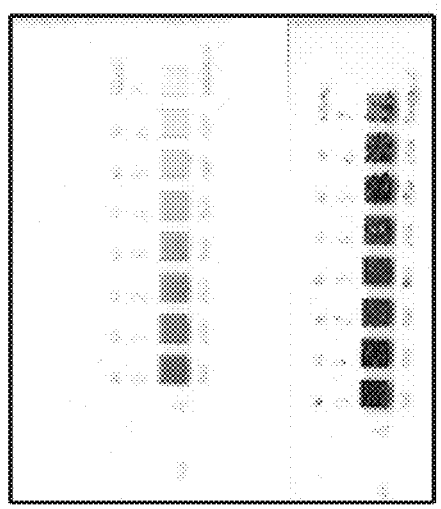
FIG. 3 is a scanned image of Comparative Example 2 on a white background and which was inscribed with a 1064 nanometer laser beam.
Figure 4:
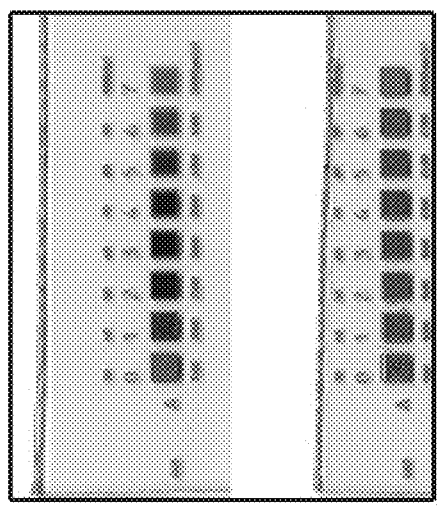
FIG. 4 is a scanned image of Comparative Example 3 on a white background and which was inscribed with a 1064 nanometer laser beam.

FIGS. 2, 3, and 4 illustrate scanned images of C1, C2, and C3, respectively. The samples were laser inscribed with a 1064 nm laser beam. The 1 mm parts were placed on a white background to emphasize contrast with the lower images in each of the figures showing the effect (i.e., inhomogeneous interaction) of lowering the line spacing from 0.05 mm to 0.03 mm.

Example 2

In this example, the effect of different additives on the samples was observed. As seen in C2 to C5, carbon black can be used to enhance the interaction of compositions with laser light to improve the dark mark contrasts (i.e., carbonization). However, the addition of low levels of carbon black can greatly lower the Tvis as measured according to ASTM D1003-00 described above and can lead to little improvement in the color contrast and inscription processing parameters when compared with organic absorbing additives (compare C2 to C5 with Samples 1 to 5). The samples in Tables 8 to 11 illustrate that light colored, reflective marks with little or no carbonization can be achieved across a wide range of concentration types and combinations.

Inorganic additives such as lanthanum hexaboride ($LaB_6$) or Cesium tungsten oxide (CTO) can also be used to enhance the interaction of compositions with laser light and improve mark contrasts. As can be seen in Table 11, the addition of low loadings of these additives did not dramatically lower the Tvis. However, C20 to C26, compositions based solely on these additives, exhibited little improvement in the color as it is believed that carbonization dominates and yields a dark mark. The contrast from the front and back was lower as compared to Samples 34 and 35, which also contained a small amount of a UV absorbing additive. L* of the front side and back side was also much lower for C20 to C26 compared to Samples 34 and 35. Surprisingly the combination or organic absorbing additives with inorganic absorbing additives such as $LaB_6$ or CTO, which are also capable of strongly absorbing light as wavelengths less than or equal to 500 nm, such as in Samples 34 and 35, gave light marks and lower profiles compared with when the organic additives were used alone. The combinations also allowed the generation of light and dark marks in the same composition by changing laser wavelength.

Figure 5:
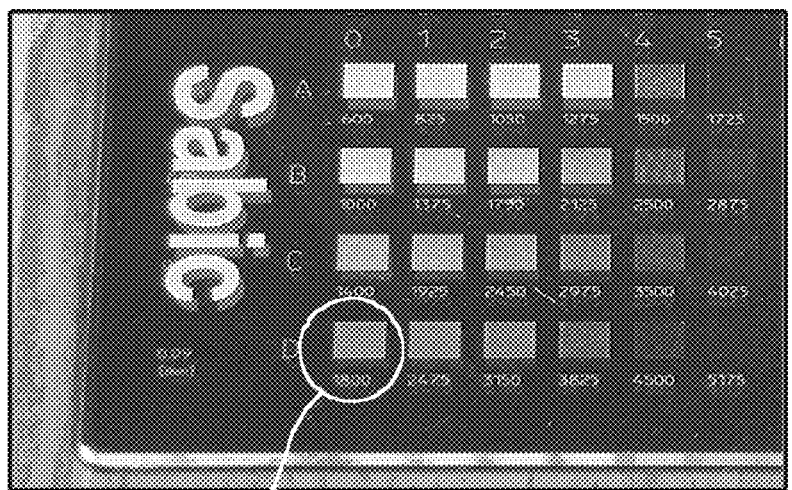
FIG. 5 is a picture of Sample 22 that was laser inscribed with a 355 nanometer laser beam and placed on a black background.
Figure 6:
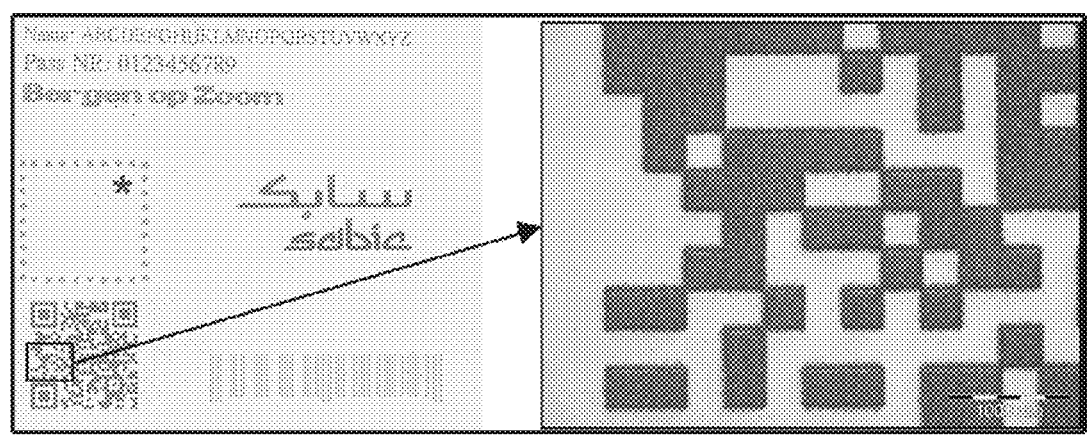
FIG. 6 is a scanned image in transmission mode illustrating the laser inscriptions on Sample 22 including text and barcodes (left image) and an optical image obtained using a microscope of a magnified part of the laser inscription viewed in transmission mode (right image).

FIG. 5 illustrates Sample 22 that was laser inscribed with a 355 nm laser beam. The 2.5 mm thick part was placed on a black background to emphasize contrast. FIG. 6 illustrates a scan of the laser inscriptions on Sample 22 in transmission mode including text and bar codes (left image). The same Quick Response Matrix Barcode (QR code) was inscribed as a watermark in the dotted area and was not visible when scanned. The right image in FIG. 6 was an optical image obtained by using a microscope of a magnified part of the QR code viewed in transmission mode. FIG. 7 is a scanning electron microscope image (×1500 magnification) of the marked square 30 in the lower left hand corner of the matrix of Sample 22 as illustrated in FIG. 5. The thermal effect of the process can be seen from this image.

TABLE 8

| Material | C13 | C14 | C15 | 19 | 20 | 21 | 22 | 23 |
| --- | --- | --- | --- | --- | --- | --- | --- | --- |
| AO1076 | 0.05 | 0.05 | 0.05 | 0.05 | 0.05 | 0.05 | 0.05 | 0.05 |
| UVA 5411 | 0.001 | 0.005 | 0.01 | 0.05 | 0.1 | 0.15 | 0.3 | 0.6 |
| PETS | 0.4 | 0.4 | 0.4 | 0.4 | 0.4 | 0.4 | 0.4 | 0.4 |
| PC6 | 99.52 | 99.51 | 99.51 | 99.47 | 99.42 | 99.37 | 99.22 | 98.92 |
| Pigment Blue 60 | 0.0109 | 0.0109 | 0.0109 | 0.0109 | 0.0109 | 0.0109 | 0.0109 | 0.0109 |
| Solvent violet 36 | 0.0153 | 0.0153 | 0.0153 | 0.0153 | 0.0153 | 0.0153 | 0.0153 | 0.0153 |
| Total | 100 | 100 | 100 | 100 | 100 | 100 | 100 | 100 |
| Tvis | 89 | 89 | 89 | 89 | 89 | 89 | 89 | 89 |
| % Transmission at 360 nm | 68 | 48 | 31 | 4 | 2 | 2 | 2 | 2 |
| L* of substrate (reflection mode) | 6 | 5 | 5 | 4 | 4 | 6 | 5 | 5 |
| Average % reflection (360-700 nm) substrate | 0.7 | 0.5 | 0.5 | 0.4 | 0.4 | 0.6 | 0.5 | 0.5 |
| 355 nm laser beam marking (95% power) | | | | | | | | |
| Contrast front | 105 | 111 | 114 | 118 | 138 | 148 | 138 | 124 |
| Contrast back | 54 | 77 | 78 | 100 | 116 | 132 | 127 | 122 |
| Delta contrast | 51 | 34 | 36 | 18 | 22 | 16 | 11 | 2 |
| Speed (mm/sec) | 600 | 600 | 600 | 675 | 750 | 975 | 1125 | 1125 |
| L* of selected mark (front side) | 44 | 45 | 46 | 56 | 60 | 62 | 61 | 59 |
| L* of selected mark (back side) | 23 | 24 | 28 | 46 | 54 | 57 | 56 | 55 |
| Delta L* mark | 21 | 21 | 18 | 10 | 6 | 4 | 5 | 4 |
| Average % reflection mark (front side) | 13.5 | 14.3 | 14.9 | 22.4 | 26.1 | 28.2 | 27.6 | 24.9 |
| Average % reflection mark (rear side) | 2.7 | 3.8 | 5.0 | 11.5 | 19.4 | 18.3 | 19.2 | 19.6 |
| Delta % Reflection mark | 10.8 | 10.4 | 9.9 | 10.9 | 6.7 | 9.8 | 8.4 | 5.3 |
| 355 nm laser beam marking (85% power) | | | | | | | | |
| Contrast front | — | — | — | 133 | 140 | 146 | 138 | 130 |
| Contrast back | — | — | — | 104 | 121 | 130 | 129 | 125 |
| Delta contrast | — | — | — | 29 | 19 | 16 | 9 | 5 |
| 355 nm laser beam marking (75% power) | | | | | | | | |
| Contrast front | — | — | — | 108 | 150 | 153 | 143 | 137 |
| Contrast back | — | — | — | 89 | 132 | 138 | 132 | 131 |
| Delta contrast | — | — | — | 19 | 18 | 15 | 11 | 6 |

TABLE 9

| Material | C16 | C17 | 24 | 25 | 26 | 27 | 28 |
|---|---|---|---|---|---|---|---|
| AO1076 | 0.05 | 0.05 | 0.05 | 0.05 | 0.05 | 0.05 | 0.05 |
| UVA 234 | 0.0005 | 0.005 | 0.05 | 0.1 | 0.15 | 0.3 | 0.6 |
| PETS | 0.4 | 0.4 | 0.4 | 0.4 | 0.4 | 0.4 | 0.4 |
| PC6 | 99.5233 | 99.5188 | 99.4738 | 99.4238 | 99.3738 | 99.2238 | 98.9238 |
| Pigment Blue 60 | 0.0109 | 0.0109 | 0.0109 | 0.0109 | 0.0109 | 0.0109 | 0.0109 |
| Solvent violet 36 | 0.0153 | 0.0153 | 0.0153 | 0.0153 | 0.0153 | 0.0153 | 0.0153 |
| Total | 100 | 100 | 100 | 100 | 100 | 100 | 100 |
| Tvis | 89 | 89 | 89 | 89 | 89 | 89 | 89 |
| % Transmission at 360 nm | 67 | 43 | 3 | 2 | 2 | 2 | 2 |
| L* of substrate (reflection mode) | 4 | 5 | 3 | 4 | 3 | 4 | 3 |
| Average % reflection (360-700 nm) substrate | 0.5 | 0.6 | 0.4 | 0.4 | 0.3 | 0.4 | 0.3 |
| 355 nm laser beam marking (95% power) | | | | | | | |
| Contrast front | 106 | 109 | 119 | 152 | 135 | 139 | 127 |
| Contrast back | 56 | 68 | 101 | 126 | 113 | 129 | 120 |
| Delta contrast | 50 | 41 | 18 | 26 | 22 | 10 | 7 |
| Speed (mm/sec) | 600 | 600 | 675 | 750 | 975 | 1050 | 1125 |
| L* of selected mark (front side) | 44 | 45 | 55 | 60 | 60 | 60 | 60 |
| L* of selected mark (back side) | 22 | 25 | 47 | 56 | 55 | 56 | 56 |
| Delta L* mark | 22 | 20 | 8 | 4 | 5 | 4 | 5 |
| Average % reflection mark (front side) | 13.2 | 14.0 | 22.2 | 26.4 | 26.8 | 26.2 | 26.3 |
| Average % reflection mark (rear side) | 2.9 | 3.9 | 14.7 | 20.8 | 19.0 | 18.2 | 18.9 |
| Delta % Reflection mark | 10.3 | 10.2 | 7.5 | 5.5 | 7.8 | 8.0 | 7.4 |
| 355 nm laser beam marking (85% power) | | | | | | | |
| Contrast front | — | — | 131 | 143 | 140 | 137 | 126 |
| Contrast back | — | — | 110 | 126 | 128 | 130 | 124 |
| Delta contrast | — | — | 21 | 17 | 12 | 7 | 2 |
| 355 nm laser beam marking (75% power) | | | | | | | |
| Contrast front | — | — | 124 | 146 | 147 | 143 | 135 |
| Contrast back | — | — | 102 | 130 | 131 | 136 | 128 |
| Delta contrast | — | — | 22 | 16 | 16 | 7 | 7 |

TABLE 10

| Material | C18 | C19 | 29 | 30 | 31 | 32 | 33 |
|---|---|---|---|---|---|---|---|
| AO1076 | 0.05 | 0.05 | 0.05 | 0.05 | 0.05 | 0.05 | 0.05 |
| CYASORB UV-3638 | 0.0005 | 0.005 | 0.05 | 0.1 | 0.15 | 0.3 | 0.6 |
| PETS | 0.4 | 0.4 | 0.4 | 0.4 | 0.4 | 0.4 | 0.4 |
| PC6 | 99.52 | 99.51 | 99.47 | 99.42 | 99.37 | 99.22 | 98.92 |
| Pigment Blue 60 | 0.0109 | 0.0109 | 0.0109 | 0.0109 | 0.0109 | 0.0109 | 0.0109 |
| Solvent violet 36 | 0.0153 | 0.0153 | 0.0153 | 0.0153 | 0.0153 | 0.0153 | 0.0153 |
| Total | 100 | 100 | 100 | 100 | 100 | 100 | 100 |
| Tvis | 89 | 89 | 89 | 89 | 89 | 89 | 89 |
| % Transmission at 360 nm | 65 | 30 | 2 | 2 | 2 | 2 | 2 |
| L* of substrate (reflection mode) | 4 | 5 | 3 | 5 | 3 | 6 | 8 |
| Average % reflection (360-700 nm) substrate | 0.5 | 0.6 | 0.3 | 0.6 | 0.4 | 0.6 | 0.8 |
| 355 nm laser beam marking (95% power) | | | | | | | |
| Contrast front | 106 | 113 | 139 | 154 | 141 | 138 | 126 |
| Contrast back | 52 | 74 | 114 | 129 | 129 | 123 | 119 |
| Delta contrast | 54 | 39 | 25 | 25 | 12 | 15 | 7 |
| Speed (mm/sec) | 600 | 600 | 750 | 825 | 1050 | 1125 | 1312 |
| L* of selected mark (front side) | 44 | 45 | 60 | 63 | 63 | 62 | 58 |
| L* of selected mark (back side) | 22 | 26 | 54 | 58 | 58 | 57 | 57 |
| Delta L* mark | 22 | 19 | 6 | 5 | 5 | 5 | 1 |
| Average % reflection mark (front side) | 13.6 | 14.4 | 26.1 | 29.1 | 29.1 | 27.8 | 24.3 |
| Average % reflection mark (rear side) | 3.3 | 4.4 | 19.1 | 22.5 | 21.9 | 21.0 | 20.3 |
| Delta % reflection mark | 10.3 | 10.0 | 6.9 | 6.6 | 7.1 | 6.8 | 4.0 |
| 355 nm laser beam marking (85% power) | | | | | | | |
| Contrast front | — | 103 | 150 | 157 | 148 | 141 | 135 |
| Contrast back | — | 57 | 130 | 139 | 133 | 132 | 126 |
| Delta contrast | — | 46 | 20 | 18 | 15 | 9 | 9 |
| 355 nm laser beam marking (75% power) | | | | | | | |
| Contrast front | — | — | 158 | 161 | 150 | 145 | 148 |
| Contrast back | — | — | 135 | 141 | 138 | 140 | 144 |
| Delta contrast | — | — | 23 | 20 | 12 | 5 | 4 |

TABLE 11

| Material | C20 | C21 | C22 | C23 | C24 | C25 | C26 | 34 | 35 |
|---|---|---|---|---|---|---|---|---|---|
| PC6 | 99.52 | 99.47 | 98.52 | 98.02 | 98.52 | 98.02 | 97.52 | 97.72 | 98.22 |
| PETS | 0.4 | 0.4 | 0.4 | 0.4 | 0.4 | 0.4 | 0.4 | 0.4 | 0.4 |
| CYASORB UV-3638 | | | | | | | | 0.3 | 0.3 |
| AO1076 | 0.05 | 0.05 | 0.05 | 0.05 | 0.05 | 0.05 | 0.05 | 0.05 | 0.05 |
| Pigment Blue 60 | 0.0109 | 0.0109 | 0.0109 | 0.0109 | 0.0109 | 0.0109 | 0.0109 | 0.0109 | 0.0109 |
| Solvent violet 36 | 0.0153 | 0.0153 | 0.0153 | 0.0153 | 0.0153 | 0.0153 | 0.0153 | 0.0153 | 0.0153 |
| CTO MB in PC | | | | | 1 | 1.5 | 2 | 1.5 | |
| $LaB_6$ MB in PC | | 0.05 | 1 | 1.5 | | | | | 1 |
| Total | 100 | 100 | 100 | 100 | 100 | 100 | 100 | 100 | 100 |
| Tvis | 90 | 88 | 85 | 83 | 90 | 89 | 89 | 90 | 85 |
| % Transmission at 360 nm | 78 | 67 | 57 | 48 | 73 | 69 | 65 | 2 | 2 |
| L* of substrate (reflection mode) | 6 | 5 | 5 | 5 | 5 | 4 | 5 | 6 | 9 |
| Average % reflection (360-700 nm) substrate | 0.7 | 0.7 | 0.7 | 0.7 | 0.6 | 0.5 | 0.6 | 0.6 | 1.0 |
| 355 nm laser beam marking (95% power) | | | | | | | | | |
| Contrast front | 98 | 88 | 92 | 104 | 90 | 101 | 103 | 165 | 169 |
| Contrast back | 56 | 32 | 17 | 18 | 41 | 31 | 31 | 143 | 129 |
| Delta contrast | 42 | 56 | 75 | 86 | 50 | 70 | 71 | 22 | 39 |
| L* of selected mark (front side) | 32 | 44 | 45 | 45 | 43 | 43 | 45 | 67 | 66 |
| L* of selected mark (back side) | 20 | 13 | 12 | 13 | 15 | 16 | 16 | 62 | 58 |
| Delta L*mark | 12 | 31 | 33 | 32 | 28 | 27 | 29 | 5 | 8 |
| Average % reflection mark (front side) | 6.9 | 13.4 | 14.0 | 14.3 | 12.6 | 13.1 | 14.2 | 34.5 | 32.5 |
| Average % reflection mark (rear side) | 3.0 | 1.5 | 1.5 | 1.6 | 1.8 | 2.1 | 2.2 | 26.5 | 20.9 |
| Delta % reflection mark | 3.9 | 11.9 | 12.5 | 12.7 | 10.8 | 11 | 12 | 8 | 11.6 |
| 355 nm laser beam marking (85% power) | | | | | | | | | |
| Contrast front | — | 89 | 91 | 92 | 96 | 96 | 95 | 175 | 176 |
| Contrast back | — | 24 | 15 | 20 | 34 | 34 | 34 | 151 | 134 |
| Delta contrast | — | 65 | 76 | 73 | 63 | 62 | 61 | 24 | 42 |
| 355 nm laser beam marking (75% power) | | | | | | | | | |
| Contrast front | — | 74 | 88 | 89 | 54 | 58 | 73 | 176 | 178 |
| Contast back | — | 15 | 21 | 22 | 27 | 22 | 25 | 148 | 134 |
| Delta contrast | — | 60 | 67 | 67 | 28 | 36 | 48 | 28 | 44 |

Figure 9:
FIG. 9 is a photographic image of Sample 35 showing a light mark on a RAL 9010-GL background, created using a laser beam having a wavelength less than 500 nanometers and a dark mark on a RAL 9005-GL background, created using a laser beam having a wavelength greater than 500 nanometers.

FIG. 9 is a photographic image of Sample 35 showing a light mark on a RAL 9010-GL background, where the mark was created using a laser beam having a wavelength of less than 500 nm and a dark mark on a RAL 9005-GL background, created using a laser beam having a wavelength of 1064 nm.

Example 3

In this example, Samples 13, 25, 30, 32, 34, and 35 were tested for profile height and compared to the profile height of C1 to C5. The average profile of the mark was measured in micrometers. As can be seen in Table 12, the average profile of the marks generated from treating thermoplastics with laser light having a wavelength of less than 500 nm was surprisingly low with lightest colored, most reflective marks exhibiting profiles less than 30 micrometers. The profiles of the dark, carbonized marks of C1 and C2 are much higher. In C3 to C5, where a foaming type process beings to take effect and the mark becomes a brown color from the front, (but is much darker when viewed from the rear side due to contribution from the carbonization process), the profile is more than double compared with laser light having a wavelength of less than 500 nm.

The profile is lower when such a light mark is not required and can be rendered to be less than 5 micrometers to generate a watermark. Watermarks that are visible only under certain angles can be achieved with profiles rendered to be less than 2 micrometers.

TABLE 12

| 355 nm laser beam marking | | | | | | | |
|---|---|---|---|---|---|---|---|
| Profile | Laser power | #13 | #25 | #30 | #32 | #34 | #35 |
| Average height of best contrast mark (micrometers) | 95% | 15.4 | 14.5 | 14.9 | 12.9 | 11.2 | 9.0 |
| | 85% | 14.9 | 13.3 | 18.9 | 14.1 | 11.2 | 11.1 |
| | 75% | 13.7 | 11.9 | 19.0 | 11.9 | 11.7 | 11.7 |
| 1064 nm laser beam marking | | | | | | | |
| Profile | Laser | C. EX. #1 | C. EX. #2 | C. EX. #3 | C-Ex. #4 | C. EX. #5 | |
| Average height of best contrast mark (micrometers) | power 95% | 104.8 | 80.3 | 59.4 | 70.9 | 73.2 | — |

Example 4

Figure 10:
FIG. 10 is a photographic image of Sample 36 laser welded to Sample 40 using a laser beam having a wavelength greater than 800 nanometers where the left image is the laser mark on the lower part (Sample 40), while the right image is the laser mark on the upper part (Sample 36).

Tables 13 and 14 demonstrate the process whereby materials can be laser welded with laser light having a wavelength longer than 800 nm and both the upper and lower joined parts are laser inscribed with laser light lower than 800 nm, specifically, less than 500 nm. FIG. 10 is a photographic image of Sample 36 laser welded to Sample 40 using a laser beam having a wavelength of 960 nm. The samples have been laser marked with a laser beam having a wavelength of 355 nm. The image on the left is the laser on the lower part (Sample 40), while the image on the right is the laser mark on the upper part (Sample 36).

TABLE 13

| Material | 36 | 37 | 38 | 39 | 40 |
| --- | --- | --- | --- | --- | --- |
| PC1 | 99.37 | 97.86 | 96.38 | 97.94 | 97.79 |
| Loxiol EP8578 | 0.4 | 0.4 | 0.4 | 0.3 | 0.4 |
| AO1076 | 0.05 | 0.05 | 0.05 | 0.036 | 0.05 |
| AO1076 | | | | 0.02 | |
| UVA 5411 | 0.15 | 0.15 | 0.15 | 0.3 | 0.25 |
| $LaB_6$ MB in PC | | 1.5 | 1.5 | 1.4 | 0.75 |
| CTO MB in PC | | | | | 0.75 |
| Pigment Black 7 | | | 0.0007 | 0.003 | |
| Solvent Red 135 | | 0.021 | 0.5 | | |
| Solvent Yellow 98 | | 0.01 | | | |
| Vat Red 41 | | 0.006 | | | |
| $TiO_2$ | | | 0.65 | | |
| Solvent Yellow 163 | | | 0.37 | | 0.002 |
| Pigment Yellow 138 | | | | | 0.01 |
| Pigment Blue 60 | 0.0109 | | | | |
| Solvent violet 36 | 0.0153 | | | | |
| Total | 100 | 100 | 100 | 100 | 100 |
| Laser absorbing > 800 nm | No | Yes | Yes | Yes | Yes |
| Laser absorbing < 500 nm | Yes | Yes | Yes | Yes | Yes |
| Laser welding geometry. Upper (U: laser transparent) or lower part (L: laser absorbing) | U | L | L | L | L |
| Part marked with 355 nm laser beam | Yes | Yes | Yes | Yes | Yes |

TABLE 14

| Material | 41 | 42 | 43 | 44 |
| --- | --- | --- | --- | --- |
| PC1 | 37.95 | 37.60 | 33.90 | 33.96 |
| PC2 | 38.26 | 38.31 | | |
| PC3 | | | 40.00 | 40.00 |
| PCTG | | | 24.78 | 24.78 |
| PETS | 0.30 | 0.30 | 0.30 | 0.30 |
| Phosphonite PEPQ | | | 0.09 | 0.09 |
| PC5 | 22.20 | 22.20 | | |
| KSS | 0.30 | 0.30 | | |
| PTFE & T-SAN | 0.30 | 0.30 | | |
| Antioxidant | 0.09 | 0.09 | | |
| Phosporic Acid solution | | | 0.05 | 0.05 |
| Styrene-acrylate-epoxy oligomer | | | 0.25 | 0.25 |
| UVA 5411 | | | 0.25 | 0.25 |
| UVA 234 | 0.30 | 0.30 | | |
| AO1010 | | | 0.12 | 0.12 |
| Solvent Green 3 | | | 0.13 | |
| Solvent Red 135 | | | 0.13 | |
| Pigment Black 7 | 0.30 | | | 0.20 |
| Solvent violet 36 | | 0.30 | | |
| Solvent Blue 104 | | 0.30 | | |
| Total | 100 | 100 | 100 | 100 |

TABLE 14-continued

| Material | 41 | 42 | 43 | 44 |
| --- | --- | --- | --- | --- |
| Laser absorbing > 800 nm | Yes | No | No | Yes |
| Laser absorbing < 500 nm | Yes | Yes | Yes | Yes |
| Laser welding geometry. Upper (U: laser transparent) or lower part (L: laser absorbing) | L | U | U | L |
| Part marked with 355 nm laser beam | Yes | Yes | Yes | Yes |

Example 5

Tables 15 to 18 demonstrate that colorants generally used to modulate the visible color of compositions can themselves contribute to the interaction of the compositions with laser light having a wavelength of less than 500 nm to give light colored marks. Achieving a light colored mark on a transparent or amorphous material (essentially non-reflecting) offers the possibility to tune the substrate color in a traditional manner. The addition of absorbing additives including, but not limited to, hydroxybenzophenones, hydroxybenzotriazoles, hydroxybenzotriazines, cyanoacrylates, oxanilides, benzoxazinones, benzylidene malonate type UV stabilizers (e.g., Samples 46, 48, 50, 52, and 54) allows the color of the laser mark to be modified. The substrate color and the color of the mark can be determined by the choice of colorant and surprisingly, can be further manipulated by the addition of an organic additive, including carbon black (compare e.g., Samples 61 and 63 with Samples 62 and 64, respectively), capable of strongly absorbing light at wavelengths less than or equal to 500 nm.

TABLE 15

| Material | 45 | 46 | 47 | 48 |
| --- | --- | --- | --- | --- |
| PC1 | 99.45 | 99.2 | 99.485 | 99.235 |
| Antioxidant | 0.05 | 0.05 | 0.05 | 0.05 |
| PETS | 0.3 | 0.3 | 0.3 | 0.3 |
| UVA 5411 | | 0.25 | | 0.25 |
| Solvent Green 3 | 0.1 | 0.1 | | |
| Solvent Red 135 | 0.1 | 0.1 | | |
| Pigment Blue 15:4 | | | 0.11 | 0.11 |
| Macrolex Violet 3R | | | 0.055 | 0.055 |
| Total | 100 | 100 | 100 | 100 |
| Absorption at 360 nm (%) | 1 | 1 | 1 | 1 |
| Average reflection (360-700 nm) substrate (%) | 0.0 | 0.0 | 0.1 | 0.0 |
| 355 nm laser beam marking (95% power) | | | | |
| L* of substrate (reflection mode) | 2 | 1 | 6 | 6 |
| a* of substrate | 1.1 | 1.0 | 15.2 | 15.1 |
| b* of substrate | 0.7 | 0.5 | −13.8 | −13.7 |
| L* of selected marks | 44 | 49 | 45 | 53 |
| a* | −0.5 | −0.5 | 1 | 0.4 |
| b* | 0.5 | −0.4 | 6.4 | 6.2 |
| Delta L* (mark − substrate) | 42 | 48 | 39 | 47 |

TABLE 16

| Material | 49 | 50 | 51 | 52 | 53 | 54 |
|---|---|---|---|---|---|---|
| PC1 | 99.553 | 99.303 | 99.5381 | 99.2881 | 99.48822 | 99.23822 |
| Antioxidant | 0.05 | 0.05 | 0.05 | 0.05 | 0.05 | 0.05 |
| PETS | 0.3 | 0.3 | 0.3 | 0.3 | 0.3 | 0.3 |
| UVA 5411 |  | 0.25 |  | 0.25 |  | 0.25 |
| Solvent Green 3 |  |  | 0.0308 | 0.0308 | 0.0462 | 0.0462 |
| Solvent Red 135 | 0.066 | 0.066 |  |  |  |  |
| Solvent Blue 104 |  |  | 0.0001 | 0.0001 | 0.00015 | 0.00015 |
| Solvent Yellow 93 |  |  | 0.0508 | 0.0508 | 0.0702 | 0.0702 |
| Solvent Red 52 |  |  | 0.0289 | 0.0289 | 0.0433 | 0.0433 |
| Pigment Black 7 | 0.005 | 0.005 | 0.0013 | 0.0013 | 0.00193 | 0.00193 |
| Pigment Blue 15:4 |  |  |  |  |  |  |
| Macrolex Violet 3R | 0.026 | 0.026 |  |  |  |  |
| Total | 100 | 100 | 100 | 100 | 100 | 100 |
| L* of substrate (reflection mode) | 3 | 3 | 1 | 1 | 1 | 1 |
| a* of substrate | 4.5 | 4.4 | 0.4 | 0.1 | 0.5 | 0.1 |
| b* of substrate | 0.9 | 0.9 | 0.3 | 0.1 | 0.2 | 0.0 |
| Average % reflection substrate (360-700 nm) | 0.2 | 0.2 | 0.0 | 0.0 | 0.1 | 0.0 |
| 355 nm laser beam marking (95% power) | | | | | | |
| L* of selected marks | 49 | 57 | 54 | 56 | 56 | 55 |
| a* | 3.6 | 3.4 | 0.9 | −0.3 | 7 | −0.3 |
| b* | 8 | 5.5 | 7.2 | 2.4 | 7.8 | 2.7 |
| Delta L* (mark − substrate) | 46 | 54 | 53 | 55 | 55 | 54 |

TABLE 17

| Material | 55 | 56 | 57 | 58 | 59 | 60 |
|---|---|---|---|---|---|---|
| PC8 | 82.8 | 82.8 | 82.8 | 82.8 | 82.8 | 82.8 |
| AO1076 | 0.06 | 0.06 | 0.06 | 0.06 | 0.06 | 0.06 |
| PC2 | 6 | 6 | 6 | 6 | 6 | 6 |
| UVA 5411 | 0.2 | 0.2 | 0.2 | 0.2 | 0.2 | 0.2 |
| 9105 | 10.69 | 10.69 | 10.658 | 10.775 | 10.776 | 10.848 |
| Solvent Green 3 | 0.125 |  |  |  |  |  |
| Solvent Red 135 | 0.125 |  | 0.18 |  | 0.018 | 0.009 |
| Solvent violet 36 |  | 0.25 | 0.09 | 0.055 | 0.075 | 0.065 |
| Pigment Yellow 138 |  |  | 0.012 |  |  |  |
| Pigment Blue 15:4 |  |  |  | 0.11 |  |  |
| Solvent Violet 13 |  |  |  |  | 0.071 |  |
| Copper Phthalocyanine Pigment Blue 15:1 |  |  |  |  |  | 0.018 |
| Total | 100 | 100 | 100 | 100 | 100 | 100 |
| L* of substrate (reflection mode) | 4 | 3 | 7 | 6 | 5 | 3 |
| a* of substrate | 0.7 | 0.4 | 2.0 | 13.9 | 0.8 | 1.1 |
| b* of substrate | −1.5 | −2.7 | −1.5 | −14.4 | −3.1 | −3.1 |
| Average % reflection substrate (360-700 nm) | 0.5 | 0.6 | 1.1 | 1.3 | 0.5 | 1.9 |
| 355 nm laser beam marking (95% power) | | | | | | |
| L* of selected marks | 50 | 47 | 47 | 55 | 50 | 54 |
| a* | −0.7 | 2.9 | 3.3 | 0.7 | 1.7 | 0.6 |
| b* | 0.2 | −3.3 | 0.6 | 5.6 | −2.3 | −0.8 |
| Delta L* (mark − substrate) | 46 | 44 | 40 | 49 | 45 | 50 |
| Delta a* | −1.4 | 2.5 | 1.3 | −13.2 | 0.9 | −0.5 |
| Delta b* | 1.7 | −0.6 | 2.1 | 20.0 | 0.8 | 2.3 |
| Average % reflection mark | 18.1 | 17.7 | 17.3 | 22.2 | 19.7 | 21.8 |
| Delta % reflection mark | 17.6 | 17.1 | 16.1 | 20.8 | 18.8 | 21.3 |

TABLE 18

| Material | 61 | 62 | 63 | 64 |
|---|---|---|---|---|
| PC8 | 82.8 | 82.8 | 82.8 | 82.8 |
| AO1076 | 0.06 | 0.06 | 0.06 | 0.06 |
| PC2 | 6 | 6 | 6 | 6 |
| UVA 5411 | 0.2 | 0.2 | 0.2 | 0.2 |
| 9105 | 10.848 | 10.838 | 10.598 | 10.588 |
| Solvent Red 135 |  |  | 0.066 | 0.066 |

TABLE 18-continued

| Material | 61 | 62 | 63 | 64 |
| --- | --- | --- | --- | --- |
| Solvent violet 36 | 0.026 | 0.026 | | |
| Pigment Yellow 138 | | | 0.3 | 0.3 |
| Pigment Black 7 | | 0.01 | | 0.01 |
| Copper Phthalocyanine Pigment Blue 15:4 | | | 0.026 | 0.026 |
| Pigment Green 7 | | | 0.016 | 0.016 |
| Total | 100 | 100 | 100 | 100 |
| L* of substrate (reflection mode) | 12 | 4 | 20 | 15 |
| a* of substrate | 3.2 | 1.9 | −22.2 | −5.0 |
| b* of substrate | −1.0 | −1.8 | 12.5 | 4.6 |
| Average % reflection substrate (360-700 nm) | 1.9 | 0.5 | 2.2 | 1.8 |
| 355 nm laser beam marking (95% power) | | | | |
| L* of selected mark | 54 | 59 | 61 | 57 |
| a* | 2.1 | 2.6 | −6.1 | −2.9 |
| b* | 1.3 | 5.8 | 16.9 | 14.2 |
| Delta L* (mark − substrate) | 42 | 55 | 41 | 42 |
| Delta a* | −1.0 | 0.7 | 16.1 | 2.1 |
| Delta b* | 2.2 | 7.6 | 4.3 | 9.6 |
| Average % reflection mark | 22.4 | 26.1 | 25.9 | 23.0 |
| Delta % reflection mark | 20.5 | 25.6 | 23.7 | 21.3 |

Surprisingly it was discovered that laser light with wavelengths less than or equal to 500 nm can interact with the compositions disclosed herein by a thermal mechanism to give light colored markings. For example, the light colored markings can be white (e.g., white, off white, bright white ivory, snow, pearl, antique white, chalk, milk white, lily, smoke, seashell, old lace, cream, linen, ghost white, beige, cornsilk, alabaster, paper, whitewash, etc.). By modulating the compositions and the method of marking, the inscriptions can be made visible to nearly visible. The combination of the method and compositions can allow text, logos, two dimensional-data matrices, and images to be inscribed in compositions such as polycarbonate, bisphenol-A polycarbonate based copolymers, polyesters, PMMA, polystyrene, polyamides, and combinations comprising at least one of the foregoing. The markings (e.g., dots) can be assembled to generate two dimensional data matrices and images of varying size and clarity by manipulating the laser process. Applications can include identification cards (e.g., license, passport, etc.). Additionally, semi-covert inscriptions can be customized to provide logos, text, and machine readable data on various components made from the compositions described herein. Applications can include data and images on identification cards, security and authentication data on phones, computers, and automotive glazing, and logs on televisions, etc.

In one embodiment, a method of inscribing a substrate comprises: contacting the substrate with a laser beam to generate a mark, wherein the mark results from increasing the reflectivity of the thermoplastic material, wherein the substrate comprises a composition comprising a non-reflective thermoplastic material.

In one embodiment, an article comprises: a thermoplastic composition material capable of absorbing light having a wavelength less than or equal to 500 nanometers; wherein the article has a reflective laser mark.

In one embodiment, a method of attaching a first component to a second component comprises: contacting a first component comprising a first component composition and a second component comprising a second component composition with an ultraviolet laser beam having a wavelength less than or equal to 500 nanometers, wherein the first component composition comprises a non-reflective thermoplastic material that is transparent to laser light having a wavelength less than or equal to 500 nanometers and wherein the second component composition comprises a non-reflective thermoplastic material capable of absorbing light having a wavelength less than or equal to 500 nanometers; and generating an interaction between the first component and the second component to attach the first component to the second component.

In one embodiment, a method for generating a mark on an article comprises: bonding a first component to a second component with a laser beam having a wavelength of greater than or equal to 800 nanometers, wherein the first component composition comprises a thermoplastic composition absorbing light having a wavelength of less than or equal to 500 nanometers and wherein the second component comprises a thermoplastic composition absorbing light having a wavelength of greater than or equal to 800 nanometers.

In the various embodiments, (i) the composition comprises a non-reflective thermoplastic material capable of absorbing light having a wavelength of less than or equal to 500 nanometers; and/or (ii) the composition further comprises an ultraviolet absorbing additive capable of absorbing light having a wavelength of less than or equal to 500 nanometers; and/or (iii) the ultraviolet absorbing additive is selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, and combinations comprising at least one of the foregoing; and/or (iv) the substrate has a maximum reflection in the visible spectrum represented by an L* value of less than 25 when measured with a black background according to ASTM E308-08 and CIELAB 1976; and/or (v) the L* value is less than 20; and/or (vi) the substrate is un-pigmented; and/or (vii) the laser beam has a wavelength less than or equal to 500 nanometers; and/or (viii) the mark is a watermark; and/or (ix) the watermark has a profile height of less than 15 micrometers; and/or (x) the profile height is less than 10 micrometers; and/or (xi) the mark is a light colored mark; and/or (xii) the light colored mark has a profile height of less than 35 micrometers; (xiii) the profile height is than 30 micrometers; and/or (xiv) the composition is colored; and/or (xv) the mark is a white mark; and/or (xvi) the composition is further inscribed with a laser beam having a wavelength greater than 500 nm to achieve a dark mark; and/or (xvii) the substrate has a Tvis of greater than 70% as measured according to ASTM D1003-00; and/or (xviii) the Tvis is greater than 75%; and/or (xix) the Tvis is greater than 80%; and/or (xx) the composition comprises a material selected from the group consisting of polycarbonate, polycarbonate copolymers, polyester, polymethyl methacrylate, polystyrene, polyamide, polyolefin, polyvinyl chloride, polyimide, polyetherimide, polylactic acid, and combinations comprising at least one of the foregoing; and/or (xxi) the mark has an increase in L* of greater than or equal to 20 compared to the thermoplastic material; and/or (xxii) the mark has an increase in L* of greater than or equal to 25 compared to the thermoplastic material; and/or (xxiii) the mark comprises individual laser inscribed dots having a diameter of less than or equal to 80 micrometers; and/or (xxiv) the diameter is less than or equal to 60 micrometers; and/or (xxv) the diameter is less than or equal to 40 micrometers; and/or (xxvi) the mark has a reflectivity greater than a surrounding area of the mark; and/or (xxvii) the mark is generated using a laser beam having a wavelength less than or equal to 500 nanometers; and/or (xxviii) the article is inscribed by a method comprising contacting a substrate with a laser beam to generate a mark, wherein the mark results from increasing the reflectivity of the thermoplastic material, wherein the substrate comprises a composition comprising a non-reflective thermoplastic material; and/or (xxix) the article comprises an authentication identifier on an identification document, a thermoplastic glazing, a business card, a gift card, a ticket, an electronic housing, a television bezel, optical glassware, and combinations comprising at least one of the foregoing; and/or (xxx) further comprising generating a mark on the second component.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to differentiate one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. "Optional" or "optionally" means that the subsequently described event or circumstance can or cannot occur, and that the description includes instances where the event occurs and instances where it does not.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of inscribing a substrate, comprising:
    contacting the substrate with a laser beam to generate a mark,
    wherein the laser beam has a wavelength less than or equal to 500 nanometers,
    wherein the mark results from increasing the reflectivity of a thermoplastic material, wherein the thermoplastic material has an initial L* value, and wherein the mark has an increase in L* value of greater than or equal to 20 compared to the initial L* value,
    wherein the substrate comprises a composition comprising the thermoplastic material capable of absorbing light having a wavelength of less than or equal to 500 nanometers; and
    wherein the thermoplastic material, in the form a plaque having a thickness of 1 millimeter, has a visible transmission of greater than 70% as measured according to ASTM D1003-00 using D65 illumination and 10 degrees observer.

2. The method of claim 1, wherein the composition further comprises an ultraviolet absorbing additive capable of absorbing light having a wavelength of less than or equal to 500 nanometers.

3. The method of claim 2, wherein the ultraviolet absorbing additive is selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, or a combination comprising at least one of the foregoing.

4. The method of claim 3, wherein the substrate has a maximum reflection in the visible spectrum represented by the initial L* value of less than 25 when measured with a black background according to ASTM E308-08 and CIELAB 1976.

5. The method of claim 4, wherein the initial L* value is less than 20.

6. The method of claim 1, wherein the substrate is unpigmented.

7. The method of claim 1, wherein the mark is a watermark.

8. The method of claim 7, wherein the watermark has a profile height of less than 15 micrometers.

9. The method of claim 8, wherein the profile height is less than 10 micrometers.

10. The method of claim 1, wherein the mark is a light colored mark.

11. The method of claim 10, wherein the light colored mark has a profile height of less than 35 micrometers.

12. The method of claim 11, wherein the profile height is less than 30 micrometers.

13. The method of claim 10, wherein the composition is colored.

14. The method of claim 10, wherein the mark is a white mark.

15. The method of claim 1, wherein the composition is further inscribed with a laser beam having a wavelength greater than 500 nanometers to achieve a dark mark.

16. The method of claim 1, wherein the visible transmission is greater than 75%.

17. The method of claim 16, wherein the visible transmission is greater than 80%.

18. The method of claim 1, wherein the composition comprises a material selected from the group consisting of polycarbonate, polycarbonate copolymers, polyester, polymethyl methacrylate, polystyrene, polyamide, polyolefin, polyvinyl chloride, polyimide, polyetherimide, polylactic acid, and combinations comprising at least one of the foregoing.

19. The method of claim 1, wherein the increase in L* value is greater than or equal to 25 compared to the initial L* value.

20. The method of claim 1, wherein the mark comprises individual laser inscribed dots having a diameter of less than or equal to 80 micrometers.

21. The method of claim 20, wherein the diameter is less than or equal to 60 micrometers.

22. The method of claim 21, wherein the diameter is less than or equal to 40 micrometers.

23. The method of claim 1, wherein the composition is colored.

24. A method for generating a mark on an article, comprising:
bonding a first component to a second component with a laser beam having a wavelength of greater than or equal to 800 nanometers, wherein the first component comprises a non-reflective thermoplastic material that can absorb light having a wavelength of less than or equal to 500 nanometers, and wherein the thermoplastic material has an initial L*,
wherein the second component comprises a thermoplastic material that can absorb light having a wavelength of greater than or equal to 800 nanometers,
contacting the first component with a second laser beam having a wavelength less than or equal to 500 nanometers to generate a mark, and
wherein the mark results from increasing the reflectivity of the non-reflective thermoplastic material;
wherein the mark has an increase in L* of greater than or equal to 20 compared to the initial L*; and
wherein the thermoplastic material, in the form a plaque having a thickness of 1 millimeter, has a visible transmission of greater than 70% as measured according to ASTM D1003-00 using D65 illumination and 10 degrees observer.

25. A method of inscribing a substrate, comprising:
contacting the substrate with a laser beam to generate a mark,
wherein the laser beam has a wavelength less than or equal to 500 nanometers,
wherein the mark results from increasing the reflectivity of a thermoplastic material, wherein the thermoplastic material, in the form a plaque having a thickness of 1 millimeter, has a percent transmission of less than or equal to 9% at the laser wavelength as measured according to ASTM D 1003-00 using D65 illumination and 10 degrees observer;
wherein the substrate comprises a composition comprising the thermoplastic material capable of absorbing light having a wavelength of less than or equal to 500 nanometers; and
wherein the thermoplastic material, at in the form a plaque having a thickness of 1 millimeter, has a visible transmission of greater than 70% as measured according to ASTM D 1003-00 using D65 illumination and 10 degrees observer.

26. The method of claim 25, wherein the percent transmission is less than or equal to 4%.

27. The method of claim 25, wherein the mark has a mark L* value measured from a back side of the substrate of greater than or equal to 46, and a delta L* value of less than or equal to 10, wherein the delta L* value is the difference in the mark L* value measured from the front side and the mark L* value measured from the back side.

28. A method of inscribing a substrate, comprising:
contacting a front side of the substrate with a laser beam to generate a mark,
wherein the laser beam has a wavelength less than or equal to 500 nanometers,
wherein the mark results from increasing the reflectivity of a thermoplastic material, wherein the mark has a mark L* value measured from a back side of the substrate of greater than or equal to 46, and a delta L* value of less than or equal to 10, wherein the delta L* value is the difference in the mark L* value measured from the front side and the mark L* value measured from the back side;
wherein the substrate comprises a composition comprising the thermoplastic material capable of absorbing light having a wavelength of less than or equal to 500 nanometers; and
wherein the substrate thermoplastic material, at in the form a plaque having a thickness of 1 millimeter, has a visible transmission of greater than 70% as measured according to ASTM D 1003-00 using D65 illumination and 10 degrees observer.

29. The method of claim 28, wherein the thermoplastic material, in the form a plaque having a thickness of 1 millimeter, has a percent transmission of less than or equal to 9% at the laser wavelength as measured according to ASTM D 1003-00 using D65 illumination and 10 degrees observer.

* * * * *